(12) United States Patent
Danziger et al.

(10) Patent No.: US 12,436,400 B2
(45) Date of Patent: Oct. 7, 2025

(54) OPTICAL SYSTEM

(71) Applicant: Lumus Ltd., Ness Ziona (IL)

(72) Inventors: Yochay Danziger, Kfar Vradim (IL);
Shimon Grabarnik, Rehovot (IL);
Ronen Chriki, Lod (IL); Eitan Ronen,
Rehovot (IL); Elad Sharlin, Mishmar
David (IL)

(73) Assignee: Lumus Ltd., Ness Ziona (IL)

( * ) Notice: Subject to any disclaimer, the term of this patent is extended or adjusted under 35 U.S.C. 154(b) by 336 days.

(21) Appl. No.: 18/101,607

(22) Filed: Jan. 26, 2023

(65) Prior Publication Data
US 2023/0168519 A1    Jun. 1, 2023

Related U.S. Application Data

(63) Continuation of application No. 17/640,004, filed as application No. PCT/IL2021/051034 on Aug. 23, 2021, now abandoned.
(Continued)

(51) Int. Cl.
*G02B 27/14* (2006.01)
*B29D 11/00* (2006.01)
(Continued)

(52) U.S. Cl.
CPC ...... *G02B 27/143* (2013.01); *B29D 11/00663* (2013.01); *G02B 6/0031* (2013.01);
(Continued)

(58) Field of Classification Search
CPC ............... G02B 27/143; G02B 27/145; G02B 27/0172; G02B 6/0055; G02B 6/0031; B29D 11/00663
See application file for complete search history.

(56) References Cited

U.S. PATENT DOCUMENTS 2,748,659 A    6/1956    Geffcken et al.
2,795,069 A    6/1957    Hardesty
(Continued)

FOREIGN PATENT DOCUMENTS

CA    3123518 A1 *    7/2020    ......... G02B 27/0081
CN    104503087        4/2015
(Continued)

OTHER PUBLICATIONS

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

*Primary Examiner* — Tina Wong
(74) *Attorney, Agent, or Firm* — Rivka Friedman

(57) ABSTRACT

An optical system employs a waveguide including a first set of partially-reflecting surfaces ("facets") for progressively redirecting image illumination propagating from a coupling-in region towards a second region, and a second set of facets in the second region for progressively coupling-out the redirected image illumination towards the eye of a viewer. The first set of facets includes at least a first facet close to the coupling-in region, a third facet fare from the coupling-in region, and a second facet located on a medial plane between the first and the third facets. The second facet is located in a subregion of the medial plane such that image illumination propagating from the coupling-in region to the third facet passes through the medial plane without passing through the second facet.

10 Claims, 20 Drawing Sheets

Related U.S. Application Data

(60) Provisional application No. 63/076,971, filed on Sep. 11, 2020, provisional application No. 63/072,174, filed on Aug. 30, 2020, provisional application No. 63/069,059, filed on Aug. 23, 2020.

(51) Int. Cl.
*F21V 8/00* (2006.01)
*G02B 27/01* (2006.01)

(52) U.S. Cl.
CPC ....... *G02B 6/0055* (2013.01); *G02B 27/0172* (2013.01); *G02B 27/145* (2013.01); *G02B 2027/013* (2013.01); *G02B 27/0189* (2013.01)

(56) References Cited

U.S. PATENT DOCUMENTS

| | | | |
|---|---|---|---|
| 2,886,911 A | 5/1959 | Hardesty | |
| 3,491,245 A | 1/1970 | Hardesty | |
| 3,626,394 A | 12/1971 | Nelson et al. | |
| 3,667,621 A | 6/1972 | Barlow | |
| 3,677,621 A | 7/1972 | Smith | |
| 3,737,212 A | 6/1973 | Antonson et al. | |
| 3,802,763 A | 4/1974 | Cook et al. | |
| 3,857,109 A | 12/1974 | Pilloff | |
| 3,873,209 A | 3/1975 | Schinke et al. | |
| 3,940,204 A | 2/1976 | Withrington | |
| 4,084,883 A | 4/1978 | Eastman et al. | |
| 4,191,446 A | 3/1980 | Arditty et al. | |
| 4,241,382 A | 12/1980 | Daniel | |
| 4,309,070 A | 1/1982 | St. Leger Searle | |
| 4,331,387 A | 5/1982 | Wentz | |
| 4,516,828 A | 5/1985 | Steele | |
| 4,613,216 A | 9/1986 | Herbec et al. | |
| 4,711,512 A | 12/1987 | Upatnieks | |
| 4,715,684 A | 12/1987 | Gagnon | |
| 4,775,217 A | 10/1988 | Ellis | |
| 4,798,448 A | 1/1989 | Van Raalte | |
| 4,805,988 A | 2/1989 | Dones | |
| 4,932,743 A | 6/1990 | Isobe et al. | |
| 4,978,952 A | 12/1990 | Irwin | |
| 5,033,828 A | 7/1991 | Haruta | |
| 5,076,664 A | 12/1991 | Migozzi | |
| 5,096,520 A | 3/1992 | Faris | |
| 5,157,526 A | 10/1992 | Kondo et al. | |
| 5,231,642 A | 7/1993 | Scifres et al. | |
| 5,301,067 A | 4/1994 | Bleier et al. | |
| 5,353,134 A | 10/1994 | Michel et al. | |
| 5,367,399 A | 11/1994 | Kramer | |
| 5,369,415 A | 11/1994 | Richard et al. | |
| 5,453,877 A | 9/1995 | Gerbe et al. | |
| 5,543,877 A | 8/1996 | Takashi et al. | |
| 5,555,329 A | 9/1996 | Kuper et al. | |
| 5,619,601 A | 4/1997 | Akashi et al. | |
| 5,650,873 A | 7/1997 | Gal et al. | |
| 5,680,209 A | 10/1997 | Meinrad | |
| 5,724,163 A | 3/1998 | David | |
| 5,751,480 A | 5/1998 | Kitagishi | |
| 5,764,412 A | 6/1998 | Suzuki et al. | |
| 5,829,854 A | 11/1998 | Jones | |
| 5,883,684 A | 3/1999 | Millikan et al. | |
| 5,896,232 A | 4/1999 | Budd et al. | |
| 5,919,601 A | 7/1999 | Nguyen et al. | |
| 5,966,223 A | 10/1999 | Yaakov et al. | |
| 5,982,536 A | 11/1999 | Swan | |
| 6,021,239 A | 2/2000 | Minami et al. | |
| 6,052,500 A | 4/2000 | Takano et al. | |
| 6,091,548 A | 7/2000 | Chen | |
| 6,144,347 A | 11/2000 | Mizoguchi et al. | |
| 6,356,392 B1 | 3/2002 | Spitzer | |
| 6,490,104 B1 | 12/2002 | Gleckman et al. | |
| 6,580,529 B1 * | 6/2003 | Amitai ............... G02B 27/0944 359/13 |
| 6,626,906 B1 | 9/2003 | Young | |
| 6,671,100 B1 | 12/2003 | McRuer et al. | |
| 6,762,801 B2 | 7/2004 | Weiss et al. | |
| 6,799,859 B1 | 10/2004 | Ida et al. | |
| 7,088,664 B2 * | 8/2006 | Kim .............. G11B 7/12 369/112.28 |
| 7,391,573 B2 | 6/2008 | Amitai | |
| 7,457,040 B2 | 11/2008 | Amitai | |
| 7,589,901 B2 | 9/2009 | DeJong et al. | |
| 7,724,443 B2 | 5/2010 | Amitai | |
| 7,751,122 B2 | 7/2010 | Amitai | |
| 7,839,575 B2 | 11/2010 | DeJong et al. | |
| 8,098,439 B2 | 1/2012 | Amitai et al. | |
| 8,140,197 B2 | 3/2012 | Lapidot et al. | |
| 8,369,019 B2 * | 2/2013 | Baker ............... G02B 27/0081 359/630 |
| 8,405,573 B2 | 3/2013 | Lapidot et al. | |
| 8,432,614 B2 | 4/2013 | Amitai | |
| 8,548,290 B2 | 10/2013 | Travers et al. | |
| 8,655,178 B2 | 2/2014 | Capron et al. | |
| 8,736,963 B2 | 5/2014 | Robbins et al. | |
| 8,743,464 B1 | 6/2014 | Amirparviz | |
| 8,760,762 B1 | 6/2014 | Kelly et al. | |
| 8,870,384 B2 | 10/2014 | Imai et al. | |
| 9,025,253 B2 | 5/2015 | Hadad et al. | |
| 9,039,906 B2 | 5/2015 | Schulz et al. | |
| 9,285,591 B1 | 3/2016 | Gupta et al. | |
| 9,791,703 B1 | 10/2017 | Vallius et al. | |
| 9,805,633 B2 | 10/2017 | Zheng | |
| 10,133,070 B2 | 11/2018 | Danziger | |
| 10,302,835 B2 | 5/2019 | Danziger | |
| 10,330,938 B2 | 6/2019 | Cheng et al. | |
| 10,359,632 B2 | 7/2019 | Schultz | |
| 10,437,068 B2 | 10/2019 | Weng | |
| 10,481,319 B2 * | 11/2019 | Danziger ........... G02B 27/0081 |
| 10,509,241 B1 | 12/2019 | Robbins et al. | |
| 10,551,544 B2 * | 2/2020 | Danziger ............... G02B 6/002 |
| 10,564,417 B2 | 2/2020 | Danziger | |
| 10,585,290 B2 | 3/2020 | Cai et al. | |
| 10,725,291 B2 * | 7/2020 | Chi ...................... G02B 6/0035 |
| 10,732,461 B2 | 8/2020 | Yoshida | |
| 10,962,787 B1 | 3/2021 | Lou et al. | |
| 10,996,475 B2 | 5/2021 | Wu | |
| 11,092,810 B2 | 8/2021 | Danziger et al. | |
| 11,256,100 B2 | 2/2022 | Schultz et al. | |
| 2002/0015233 A1 | 2/2002 | Park | |
| 2002/0191297 A1 | 12/2002 | Gleckman et al. | |
| 2003/0007157 A1 | 1/2003 | Hulse et al. | |
| 2003/0020006 A1 | 1/2003 | Janeczko et al. | |
| 2003/0063042 A1 | 4/2003 | Friesem et al. | |
| 2003/0090439 A1 | 5/2003 | Spitzer et al. | |
| 2003/0165017 A1 * | 9/2003 | Amitai ............... G02B 27/0172 359/636 |
| 2003/0197938 A1 | 10/2003 | Schmidt et al. | |
| 2003/0218718 A1 | 11/2003 | Moliton et al. | |
| 2004/0085649 A1 * | 5/2004 | Repetto ............... G02B 27/0101 359/633 |
| 2004/0137189 A1 | 7/2004 | Tellini et al. | |
| 2005/0017465 A1 | 1/2005 | Bergstrom | |
| 2005/0018308 A1 | 1/2005 | Cassarly et al. | |
| 2005/0084210 A1 | 4/2005 | Cha | |
| 2005/0174641 A1 | 8/2005 | Greenberg | |
| 2005/0174658 A1 | 8/2005 | Long et al. | |
| 2005/0180687 A1 | 8/2005 | Amitai | |
| 2005/0265044 A1 | 12/2005 | Chen et al. | |
| 2006/0126182 A1 | 6/2006 | Levola | |
| 2006/0268421 A1 | 11/2006 | Shimizu et al. | |
| 2006/0291021 A1 | 12/2006 | Mukawa | |
| 2007/0002191 A1 | 1/2007 | Hashizume et al. | |
| 2007/0007157 A1 | 1/2007 | Buschmann et al. | |
| 2007/0064310 A1 | 3/2007 | Mukawa et al. | |
| 2007/0070859 A1 | 3/2007 | Hirayama | |
| 2008/0094586 A1 | 4/2008 | Hirayama | |
| 2008/0106775 A1 | 5/2008 | Amitai et al. | |
| 2008/0151379 A1 | 6/2008 | Amitai | |
| 2008/0186604 A1 | 8/2008 | Amitai | |
| 2008/0198471 A1 | 8/2008 | Amitai | |
| 2008/0239422 A1 | 10/2008 | Noda | |
| 2008/0278812 A1 | 11/2008 | Amitai | |
| 2008/0285140 A1 | 11/2008 | Amitai | |

(56) References Cited

U.S. PATENT DOCUMENTS

| | | |
|---|---|---|
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2009/0190222 A1 | 7/2009 | Simmonds et al. |
| 2010/0020204 A1 | 1/2010 | Fleischer et al. |
| 2010/0021465 A1 | 1/2010 | Lobanenkov et al. |
| 2010/0067110 A1 | 3/2010 | Yaakov et al. |
| 2010/0111472 A1 | 5/2010 | DeJong |
| 2010/0171680 A1 | 7/2010 | Lapidot et al. |
| 2010/0202128 A1 | 8/2010 | Saccomanno |
| 2010/0278480 A1 | 11/2010 | Vasylyev et al. |
| 2010/0291489 A1 | 11/2010 | Moskovits et al. |
| 2011/0194163 A1 | 8/2011 | Shimizu et al. |
| 2011/0277361 A1 | 11/2011 | Nichol et al. |
| 2012/0039576 A1 | 2/2012 | Dangel et al. |
| 2012/0147361 A1 | 6/2012 | Mochizuki et al. |
| 2012/0179369 A1 | 7/2012 | Lapidot et al. |
| 2012/0182525 A1 | 7/2012 | Imai et al. |
| 2012/0206817 A1 | 8/2012 | Totani et al. |
| 2012/0306940 A1 | 12/2012 | Machida et al. |
| 2013/0007833 A1 | 1/2013 | Kitazato et al. |
| 2013/0229717 A1 | 9/2013 | Amitai |
| 2013/0276960 A1 | 10/2013 | Amitai |
| 2013/0279017 A1 | 10/2013 | Amitai |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0160577 A1 | 6/2014 | Dominic et al. |
| 2014/0185142 A1 | 7/2014 | Gupta et al. |
| 2014/0226215 A1 | 8/2014 | Komatsu et al. |
| 2014/0374377 A1 | 12/2014 | Schulz et al. |
| 2015/0013105 A1 | 1/2015 | Kuan |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0160529 A1 | 6/2015 | Popovich et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0247976 A1 | 9/2015 | Abovitz et al. |
| 2015/0260992 A1 | 9/2015 | Luttmann et al. |
| 2015/0277127 A1 | 10/2015 | Amitai |
| 2015/0293360 A1 | 10/2015 | Amitai |
| 2015/0338655 A1 | 11/2015 | Sawada et al. |
| 2016/0116739 A1 | 4/2016 | TeKolste et al. |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0234485 A1 | 8/2016 | Robbins et al. |
| 2016/0274361 A1 | 9/2016 | Border et al. |
| 2016/0282622 A1 | 9/2016 | Hiraide |
| 2016/0341964 A1 | 11/2016 | Amitai |
| 2016/0349518 A1 | 12/2016 | Amitai et al. |
| 2017/0045743 A1 | 2/2017 | Dobschal et al. |
| 2017/0045744 A1 | 2/2017 | Amitai |
| 2017/0052376 A1 | 2/2017 | Amitai |
| 2017/0052377 A1 | 2/2017 | Amitai |
| 2017/0242249 A1 | 8/2017 | Wall |
| 2017/0285346 A1 | 10/2017 | Pan |
| 2017/0293140 A1 | 10/2017 | Cai et al. |
| 2017/0315346 A1 | 11/2017 | Tervo et al. |
| 2017/0336636 A1 | 11/2017 | Amitai et al. |
| 2017/0343822 A1 | 11/2017 | Border et al. |
| 2017/0357095 A1 | 12/2017 | Amitai |
| 2017/0357100 A1 | 12/2017 | Ouderkirk et al. |
| 2017/0363799 A1 | 12/2017 | Ofir et al. |
| 2017/0371160 A1 | 12/2017 | Schultz |
| 2018/0039082 A1 | 2/2018 | Amitai |
| 2018/0067315 A1 | 3/2018 | Amitai et al. |
| 2018/0143509 A1 | 5/2018 | Oh |
| 2018/0157057 A1 | 6/2018 | Gelberg et al. |
| 2018/0210202 A1* | 7/2018 | Danziger ............... G02B 5/30 |
| 2018/0246333 A1 | 8/2018 | Cheng et al. |
| 2018/0267312 A1 | 9/2018 | Melli |
| 2018/0267317 A1 | 9/2018 | Amitai |
| 2018/0275384 A1 | 9/2018 | Danziger et al. |
| 2018/0284448 A1 | 10/2018 | Matsuki et al. |
| 2018/0292592 A1 | 10/2018 | Danziger |
| 2018/0292599 A1 | 10/2018 | Ofir et al. |
| 2018/0348562 A1 | 12/2018 | Yoshida |
| 2018/0373039 A1 | 12/2018 | Amitai |
| 2019/0011710 A1 | 1/2019 | Amitai |
| 2019/0029392 A1 | 1/2019 | Carraro |
| 2019/0056593 A1 | 2/2019 | Bablumyan |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger |
| 2019/0227215 A1 | 7/2019 | Danziger et al. |
| 2019/0227317 A1 | 7/2019 | Trail et al. |
| 2019/0278086 A1 | 9/2019 | Ofir |
| 2019/0285900 A1 | 9/2019 | Amitai |
| 2019/0293838 A1 | 9/2019 | Haba et al. |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0011021 A1 | 1/2020 | Zhang |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0192101 A1 | 6/2020 | Ayres et al. |
| 2020/0200963 A1 | 6/2020 | Eisenfeld et al. |
| 2020/0209667 A1 | 7/2020 | Sharlin et al. |
| 2020/0225484 A1 | 7/2020 | Takagi et al. |
| 2020/0241308 A1 | 7/2020 | Danziger et al. |
| 2020/0249481 A1 | 8/2020 | Danziger et al. |
| 2020/0278554 A1 | 9/2020 | Schultz et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0149199 A1 | 5/2021 | Guan et al. |

(56) References Cited

U.S. PATENT DOCUMENTS

| | | |
|---|---|---|
| 2021/0333862 A1 | 10/2021 | Shimizu |
| 2022/0004007 A1 | 1/2022 | Bhakta et al. |
| 2022/0107499 A1 | 4/2022 | Amitai |
| 2022/0128816 A1 | 4/2022 | Danziger et al. |
| 2022/0244546 A1 | 8/2022 | Amitai |
| 2022/0269098 A1* | 8/2022 | Danziger ........... G02B 27/0081 |
| 2022/0317467 A1 | 10/2022 | Danziger |

FOREIGN PATENT DOCUMENTS

| | | |
|---|---|---|
| CN | 109613644 A | 4/2019 |
| JP | 2003140081 | 5/2003 |
| JP | 2011-028141 | 2/2011 |

* cited by examiner

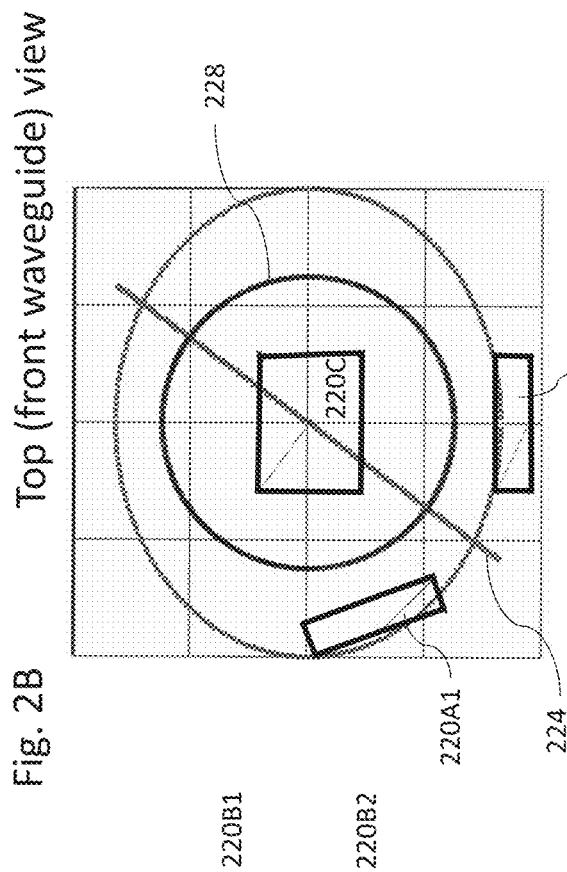
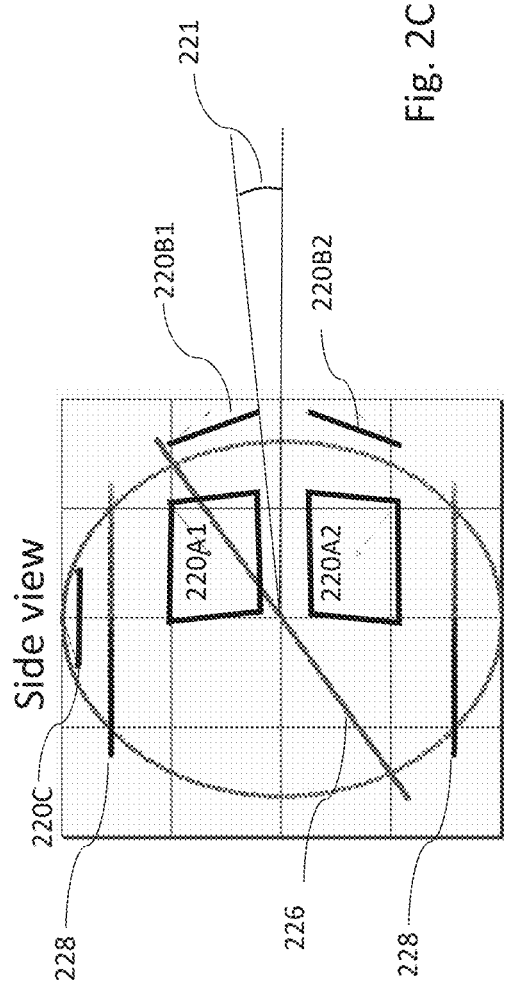
Fig. 2A    Fig. 2B    Fig. 2C

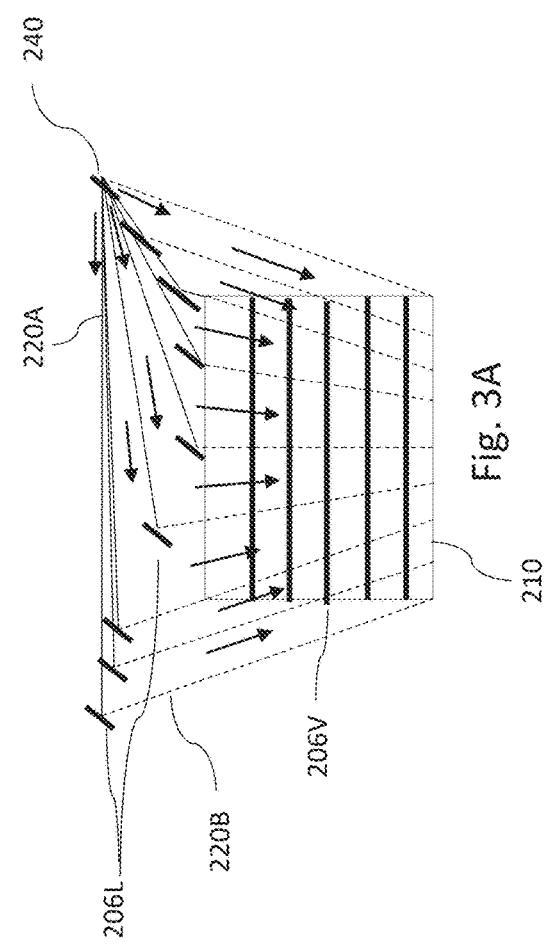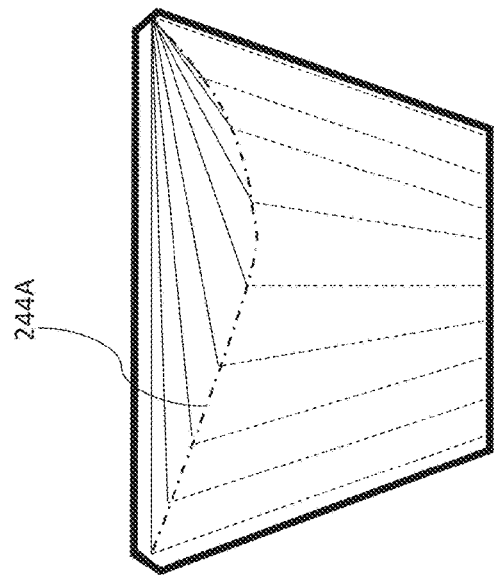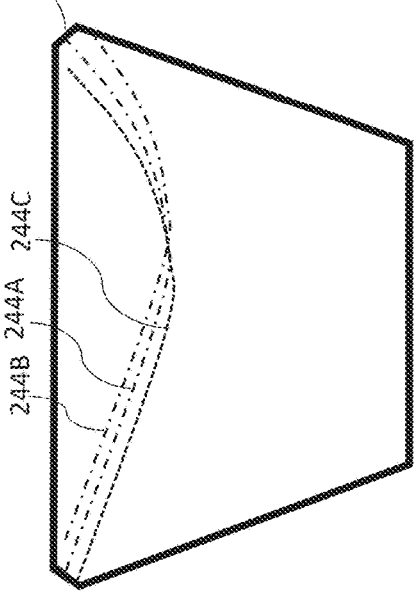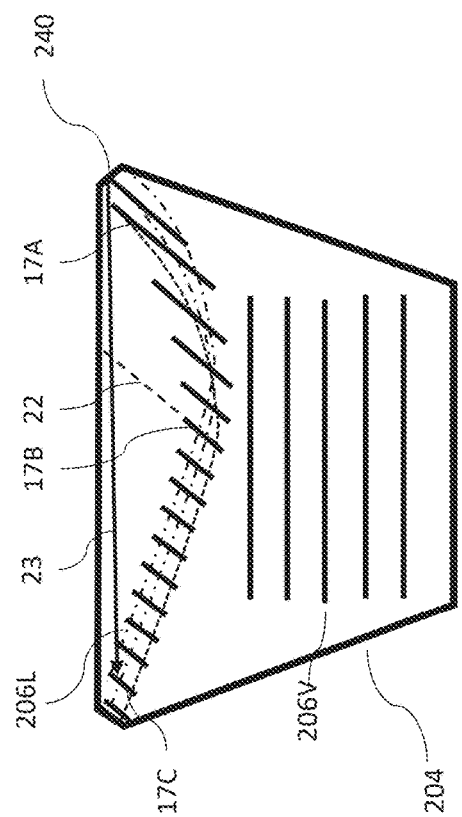
Fig. 3A
Fig. 3B
Fig. 3C
Fig. 3D

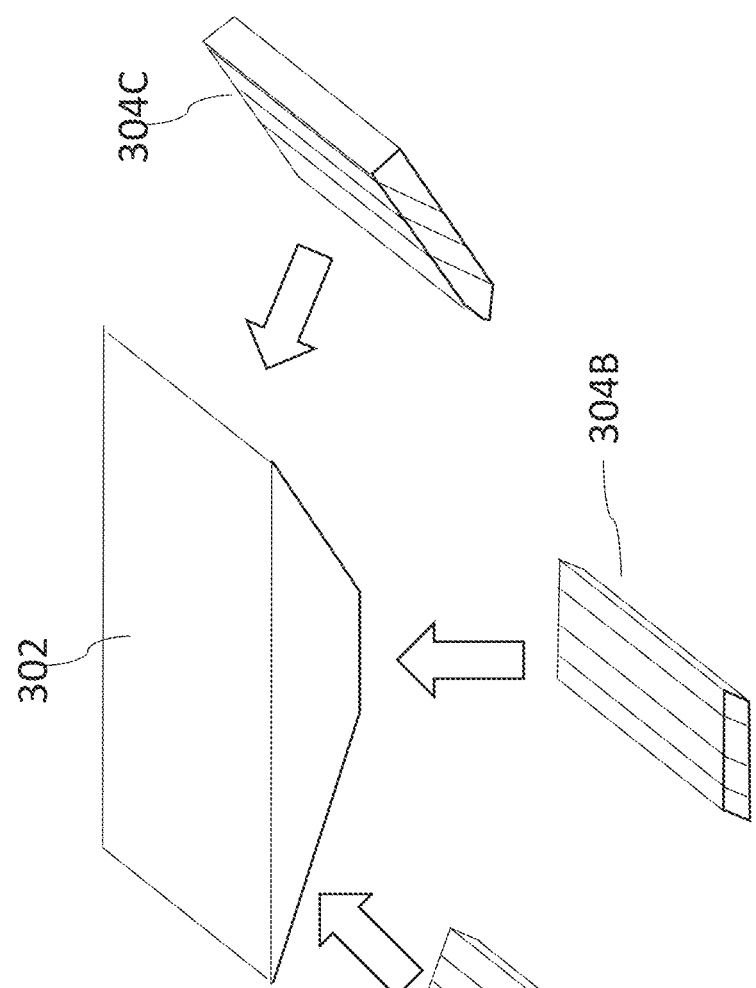
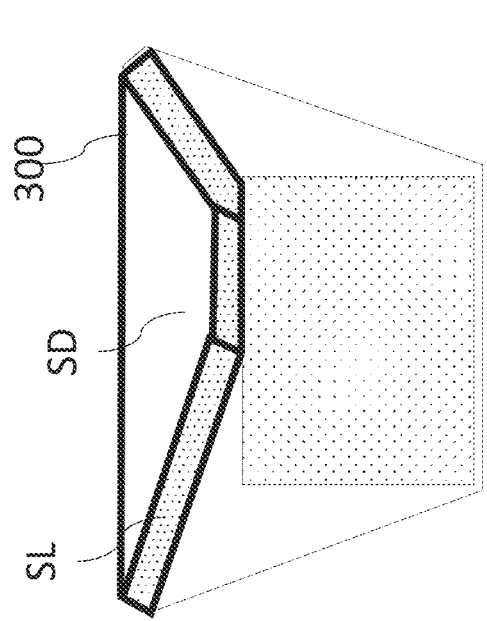

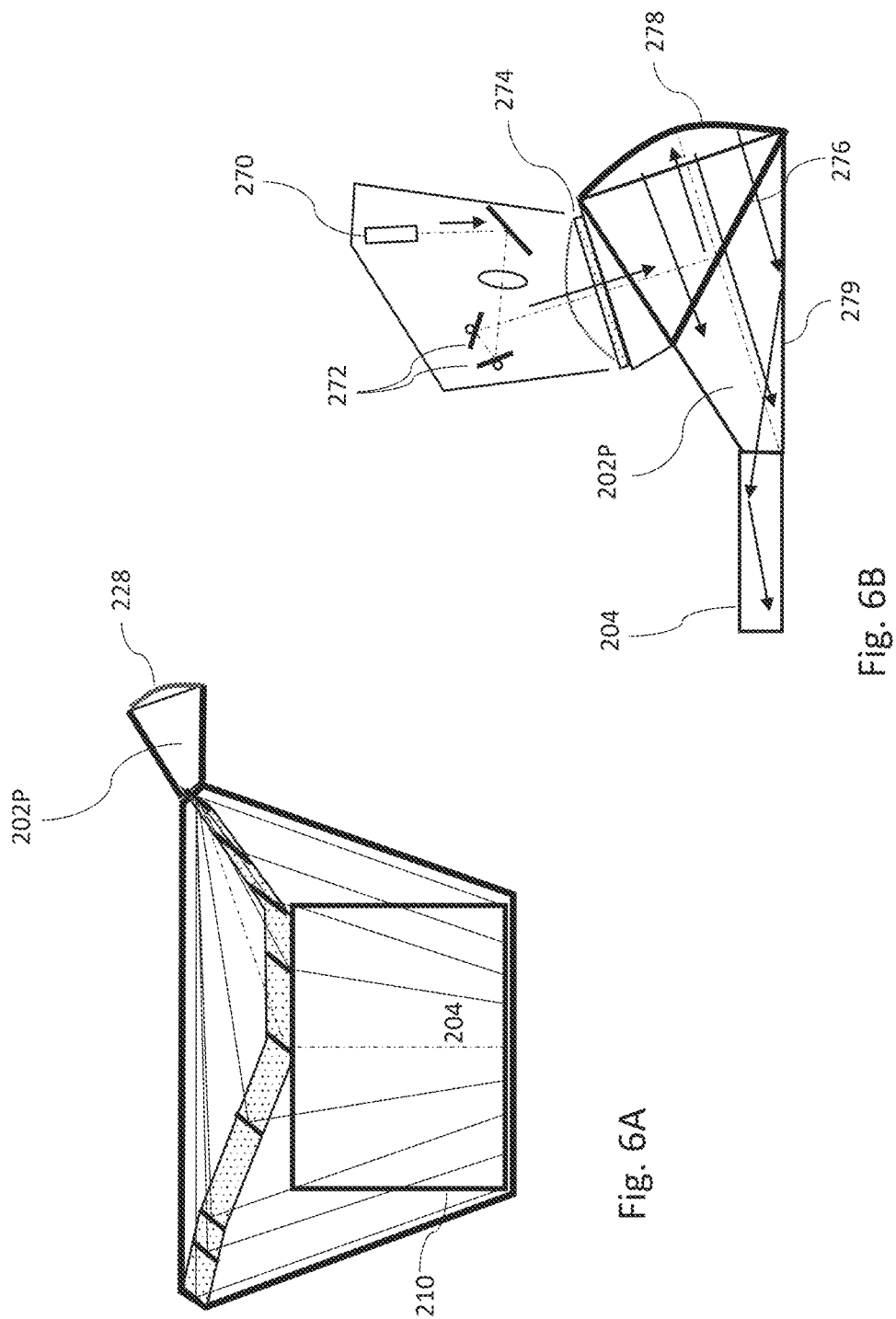

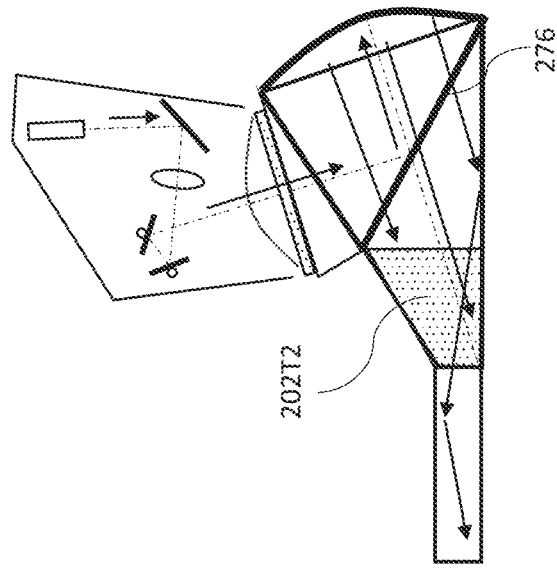
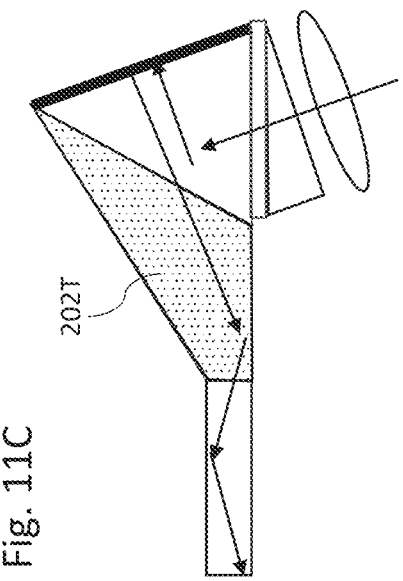
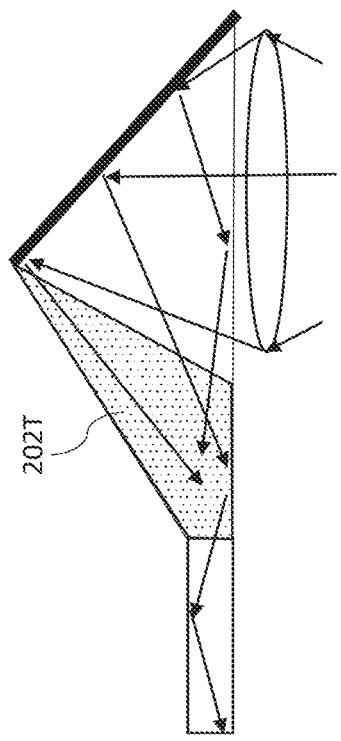
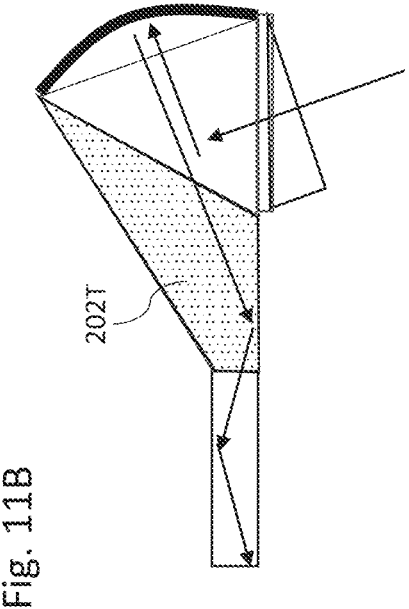

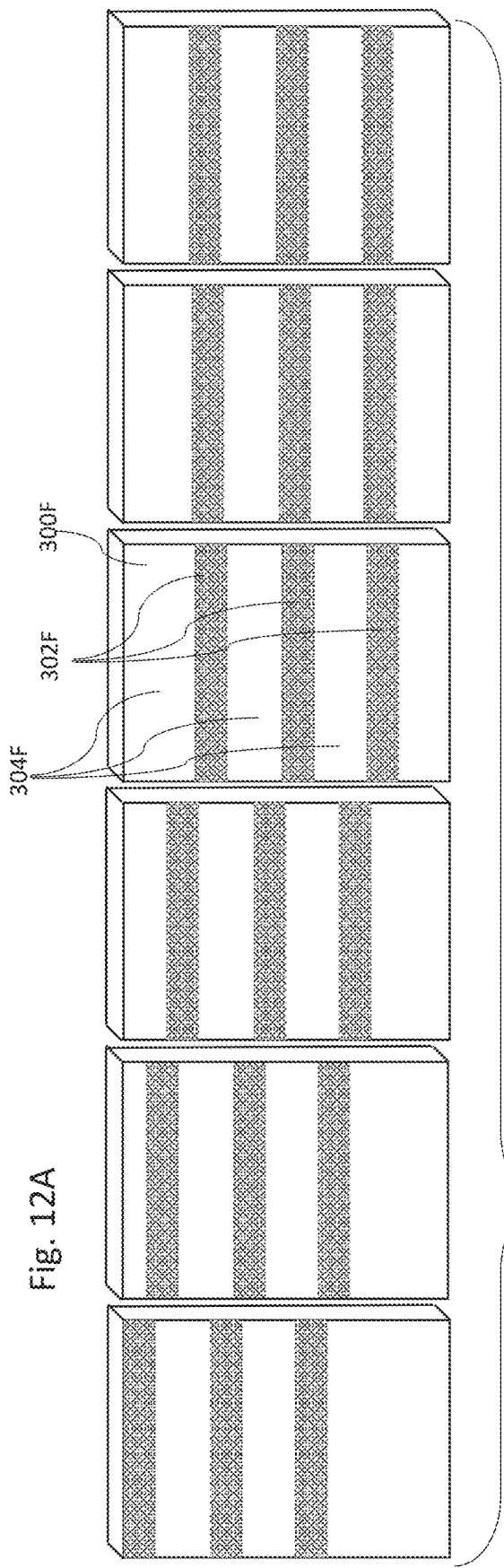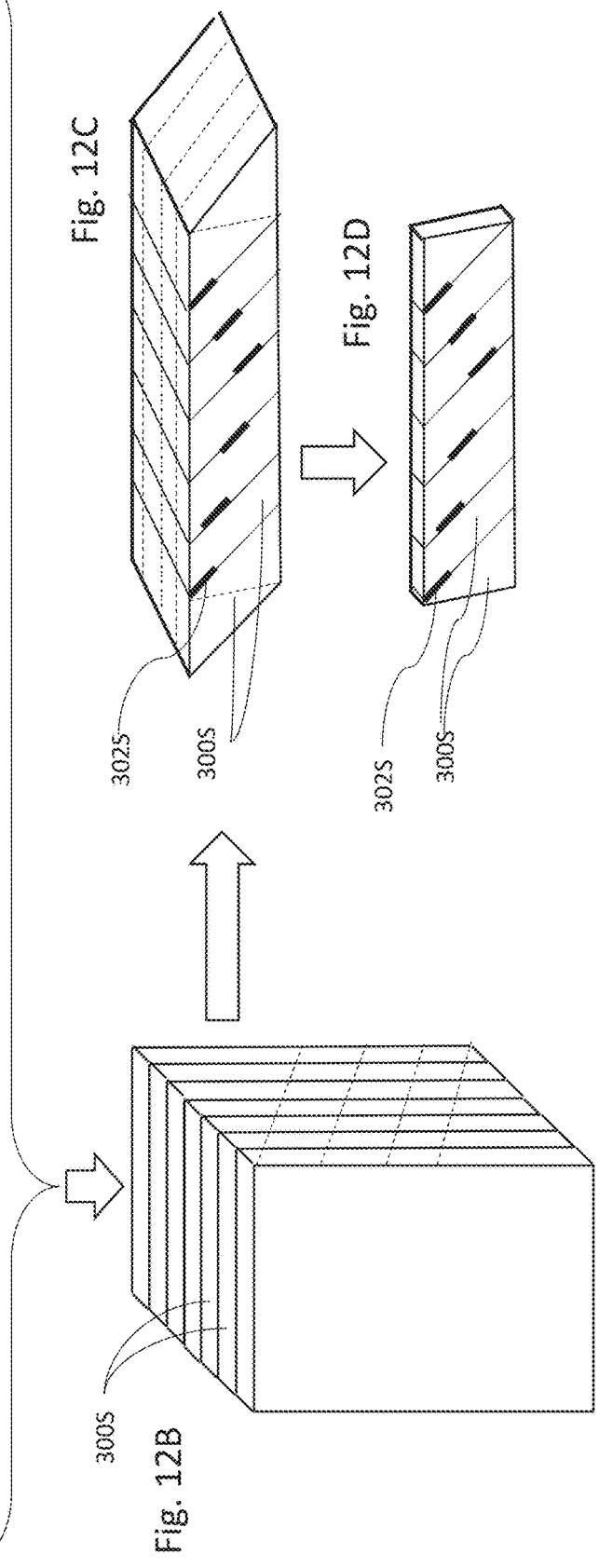

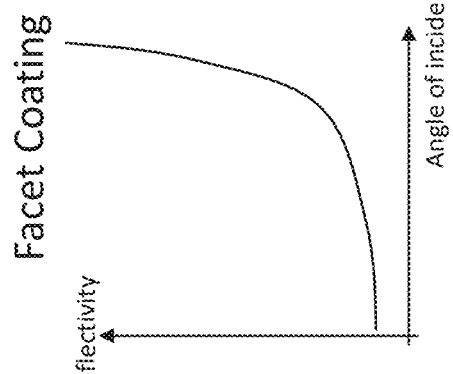
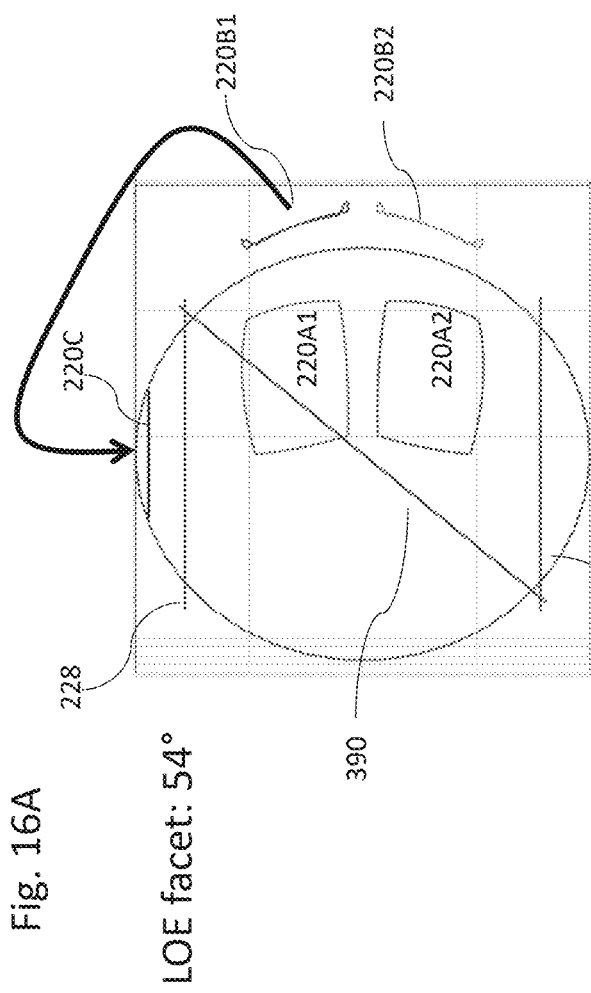
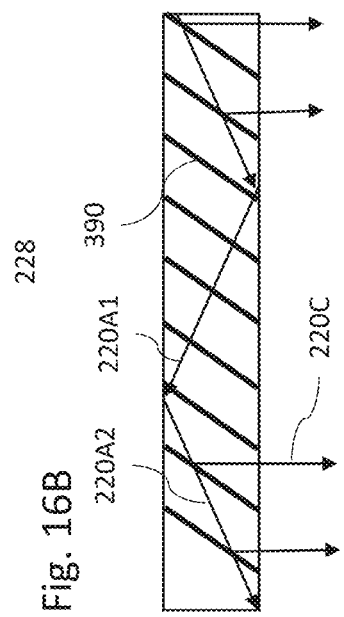
Fig. 16A
LOE facet: 54°
Fig. 16B
Fig. 16C

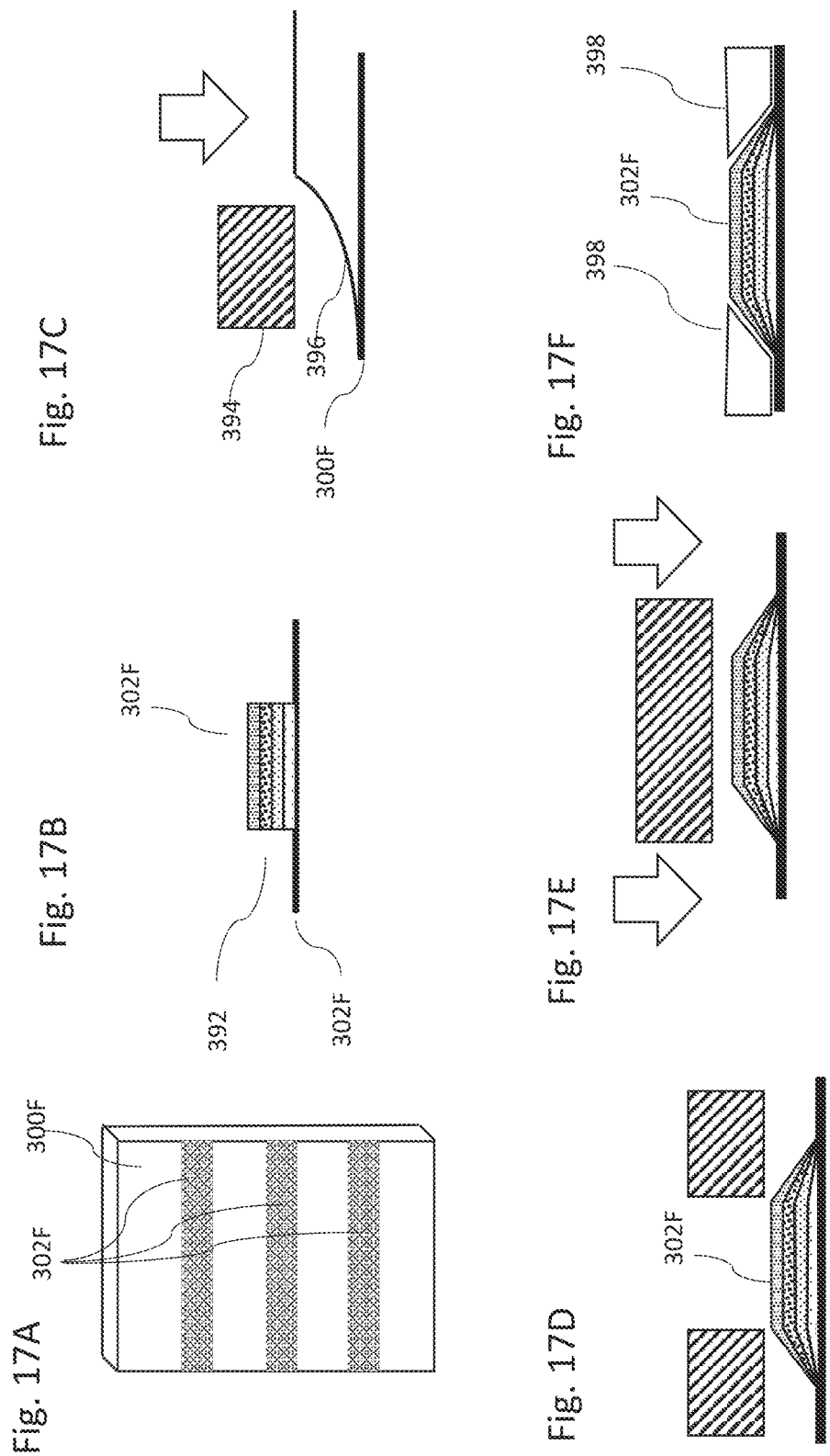

OPTICAL SYSTEM

FIELD AND BACKGROUND OF THE INVENTION

The present invention relates to optical systems and, in particular, it concerns an optical system for two-dimensional expansion of an image from an image projector for display to a user.

A near eye display optical engine is shown in FIG. 1A, including an image projector 200 that projects image light having an angular field through transmissive coupling prism 202T and through vertical aperture 203V into waveguide 204. The light propagates in the waveguide, being reflected by total internal reflection. Partial reflectors 206 embedded in the waveguide reflect the image out of the waveguide (dashed arrows) towards the observer having eyeball center 208.

FIG. 1B shows an alternative way of coupling into the waveguide by using reflective coupling prism 202R having mirror on its back side.

FIG. 1C shows schematically a front view of a 2D aperture expansion waveguide. Here image projector 200 injects an image through coupling prism 202 through lateral aperture 203L (203V is also present, but not visible from this orientation) into waveguide 204. The image light ray 220A propagates laterally in the waveguide as it reflects by TIR between the waveguide faces. Here two sets of facets are used: set 206L expand the aperture laterally by reflecting the guided image progressively to a different guided direction 220B while facets set 206V expand the aperture vertically by progressively coupling the image out from area 210 on the waveguide onto the observer's eye.

SUMMARY OF THE INVENTION

The present invention is an optical system for directing image illumination injected at a coupling-in region to an eye-motion box for viewing by a user.

According to the teachings of an embodiment of the present invention there is provided, an optical system for directing image illumination injected at a coupling-in region to an eye-motion box for viewing by an eye of a user, the optical system comprising a light-guide optical element (LOE) formed from transparent material, the LOE comprising: (a) a first region containing a first set of planar, mutually-parallel, partially-reflecting surfaces having a first orientation; (b) a second region containing a second set of planar, mutually-parallel, partially-reflecting surfaces having a second orientation non-parallel to the first orientation; (c) a set of mutually-parallel major external surfaces, the major external surfaces extending across the first and second regions such that both the first set of partially-reflecting surfaces and the second set of partially-reflecting surfaces are located between the major external surfaces, wherein the second set of partially-reflecting surfaces are at an oblique angle to the major external surfaces so that a part of image illumination propagating within the LOE by internal reflection at the major external surfaces from the first region into the second region is coupled out of the LOE towards the eye-motion box, and wherein the first set of partially-reflecting surfaces are oriented so that a part of image illumination propagating within the LOE by internal reflection at the major external surfaces from the coupling-in region is deflected towards the second region, wherein the first set of partially-reflecting surfaces comprises a first partially-reflecting surface proximal to the coupling-in region so as to contribute to a first part of a field of view of the user as viewed at the eye-motion box, a third partially-reflecting surface distal to the coupling-in region so as to contribute to a third part of a field of view of the user as viewed at the eye-motion box, and a second partially-reflecting surface lying in a medial plane between the first and the third partially-reflecting surfaces so as to contribute to a second part of a field of view of the user as viewed at the eye-motion box, wherein the second partially-reflecting surface is deployed in a subregion of the medial plane such that image illumination propagating from the coupling-in region to the third partially-reflecting surface and contributing to the third part of the field of view of the user as viewed at the eye-motion box passes through the medial plane without passing through the second partially-reflecting surface.

According to a further feature of an embodiment of the present invention, the coupling-in region comprises a coupling-in prism having a first planar surface that is a continuation of one of the major external surfaces in the first region, the coupling-in prism having a thickness dimension measured perpendicular to the major external surfaces that is greater than a thickness of the LOE.

According to a further feature of an embodiment of the present invention, the coupling-in prism presents a coupling-in surface and a transition line between the coupling-in prism as the LOE, the coupling-in surface defining an optical aperture of the coupling-in prism in a dimension parallel to the major external surfaces and the transition line defining an optical aperture of the coupling-in prism in a dimension perpendicular to the major external surfaces.

According to a further feature of an embodiment of the present invention, the first set of partially-reflecting surfaces further comprises at least one partially-reflecting surface located within a volume of the coupling-in prism.

There is also provided according to the teachings of an embodiment of the present invention, an optical system for directing image illumination injected at a coupling-in region to an eye-motion box for viewing by an eye of a user, the optical system comprising a light-guide optical element (LOE) formed from transparent material, the LOE comprising: (a) a first region containing a first set of planar, mutually-parallel, partially-reflecting surfaces having a first orientation; (b) a second region containing a second set of planar, mutually-parallel, partially-reflecting surfaces having a second orientation non-parallel to the first orientation; (c) a set of mutually-parallel major external surfaces, the major external surfaces extending across the first and second regions such that both the first set of partially-reflecting surfaces and the second set of partially-reflecting surfaces are located between the major external surfaces, wherein the second set of partially-reflecting surfaces are at an oblique angle to the major external surfaces so that a part of image illumination propagating within the LOE by internal reflection at the major external surfaces from the first region into the second region is coupled out of the LOE towards the eye-motion box, and wherein the first set of partially-reflecting surfaces are oriented so that a part of image illumination propagating within the LOE by internal reflection at the major external surfaces from the coupling-in region is deflected towards the second region, wherein the coupling-in region comprises a coupling-in prism having a first planar surface that is a continuation of one of the major external surfaces in the first region, the coupling-in prism having a thickness dimension measured perpendicular to the major external surfaces that is greater than a thickness of the LOE, and wherein the coupling-in prism presents a coupling-in surface and a transition line between the coupling-in prism as the LOE, the coupling-in surface defining an optical aperture of the coupling-in prism in a dimension parallel to the major external surfaces and the transition line defining an optical aperture of the coupling-in prism in a dimension perpendicular to the major external surfaces.

According to a further feature of an embodiment of the present invention, the first set of partially-reflecting surfaces further comprises at least one partially-reflecting surface located within a volume of the coupling-in prism.

There is also provided according to the teachings of an embodiment of the present invention, an optical system for directing image illumination injected at a coupling-in region to an eye-motion box for viewing by an eye of a user, the optical system comprising a light-guide optical element (LOE) formed from transparent material, the LOE comprising: (a) a first region containing a first set of planar, mutually-parallel, partially-reflecting surfaces having a first orientation; (b) a second region containing a second set of planar, mutually-parallel, partially-reflecting surfaces having a second orientation non-parallel to the first orientation; (c) a set of mutually-parallel major external surfaces, the major external surfaces extending across the first and second regions such that both the first set of partially-reflecting surfaces and the second set of partially-reflecting surfaces are located between the major external surfaces, wherein the second set of partially-reflecting surfaces are at an oblique angle to the major external surfaces so that a part of image illumination propagating within the LOE by internal reflection at the major external surfaces from the first region into the second region is coupled out of the LOE towards the eye-motion box, and wherein the first set of partially-reflecting surfaces are oriented so that a part of image illumination propagating within the LOE by internal reflection at the major external surfaces from the coupling-in region is deflected towards the second region, wherein the coupling-in region comprises a coupling-in prism having a first planar surface that is a continuation of one of the major external surfaces in the first region, the coupling-in prism having a thickness dimension measured perpendicular to the major external surfaces that is greater than a thickness of the LOE, and wherein the first set of partially-reflecting surfaces further comprises at least one partially-reflecting surface located within a volume of the coupling-in prism.

According to a further feature of an embodiment of the present invention, the coupling-in prism presents a coupling-in surface and a transition line between the coupling-in prism as the LOE, the coupling-in surface defining an optical aperture of the coupling-in prism in a dimension parallel to the major external surfaces and the transition line defining an optical aperture of the coupling-in prism in a dimension perpendicular to the major external surfaces.

According to a further feature of an embodiment of the present invention, the coupling-in prism is bonded to the LOE at an edge surface of the LOE. Alternatively, the coupling-in prism may be bonded to one of the major external surfaces of the LOE.

BRIEF DESCRIPTION OF THE DRAWINGS

The invention is herein described, by way of example only, with reference to the accompanying drawings, wherein:

FIGS. 2A-2C are isometric, top and side views, respectively, of an angular representation of the image propagation through an optical system according to the teachings of the present invention;

FIG. 3A is a schematic front view of a light-guide optical element (LOE, or waveguide), constructed and operative according to the teachings of an aspect of the present invention, illustrating propagation of image illumination from a coupling-in region to a first set of partially-reflecting surfaces (facets), and from the first set of facets to a second set of facets;

FIG. 3B is a view similar to FIG. 3A illustrating a theoretical locus of facet locations required for providing a field of view (FOV) to a single viewing point;

FIG. 3C is a view similar to FIG. 3B illustrating a corresponding set of loci for facet locations to provide a FOV across an "eye-motion box" (EMB) of permitted viewing locations;

FIG. 3D is a view similar to FIG. 3A illustrating the required facet positions and dimensions in order to span the loci illustrated in FIG. 3C;

FIG. 3G is a view similar to FIG. 3F in which the concave polygon containing the first set of facets is subdivided into a number of non-concave blocks or slices;

FIG. 3H is a schematic isometric view illustrating how such blocks can be assembled to produce the structure of FIG. 3G, for subsequent slicing to form a plurality of LOEs;

FIG. 6A is a schematic front view similar to FIG. 5A illustrating the use of an integrated laser-scanning image projector integrated with a coupling-in prism;

FIG. 6B is a schematic side view of the integrated laser-scanning image projector integrated with a coupling-in prism of FIG. 6A;

FIGS. 11A-11C are views similar to FIGS. 7A, 7C and 7D, respectively, illustrating implementations of these geometries with partially-reflective facets within the coupling prisms;

FIG. 11D is a view similar to FIG. 6B illustrating an implementation of this geometry with partially-reflective facets within the coupling prism;

FIG. 12A is a schematic isometric view of a series of plates with selectively-deployed partially-reflecting coatings, each according to a pattern required for a different plane of the LOE of FIG. 3D, for assembly according to a production method of the present invention;

FIG. 12B is a schematic isometric view of a stack of plates formed by bonding together the series of plates of FIG. 12A;

FIG. 12C is a schematic isometric view of a block formed by slicing the stack of FIG. 12B along the indicated dashed lines;

FIG. 12D is a schematic isometric view of (a part of) an LOE formed by slicing the block of FIG. 12C along the indicated dashed lines;

FIG. 16A is a side view of an angular representation of the image propagation through the second region of an LOE according to a variant implementation of the present invention employing a high-inclination second set of partially-reflecting surfaces;

FIG. 16B is a schematic side view of the second region of the LOE implemented according to the optical geometry of FIG. 16A;

FIG. 16C is a graph indicating schematically the preferred angle dependence of reflectance of the facets for the implementation of FIG. 16B;

FIG. 17A is a schematic isometric view of a plate with selectively-deployed partially-reflecting coatings, similar to the plates of FIG. 12A;

FIG. 17B is an enlarged schematic side view illustrating a coated region implemented with an abrupt edge;

FIG. 17C is a schematic illustration of the use of a raised mask to generate a coating with a marginal region of gradually-varying thickness;

FIG. 17D is a schematic illustration of the use of the principle of FIG. 17C to deposit a multi-layer coating with a marginal region of gradually-varying thickness;

FIG. 17E is a schematic illustration of the use of a second raised mask to generate a complementary transparent coating in regions not coated by the first process; and FIG. 17F is a schematic side view illustrating a partially-reflecting region resulting from the sequence of coating processes described with reference to FIGS. 17D and 17E.

DESCRIPTION OF THE PREFERRED EMBODIMENTS

The present invention is an optical system for directing image illumination injected at a coupling-in region to an eye-motion box for viewing by a user.

Figure 1C:
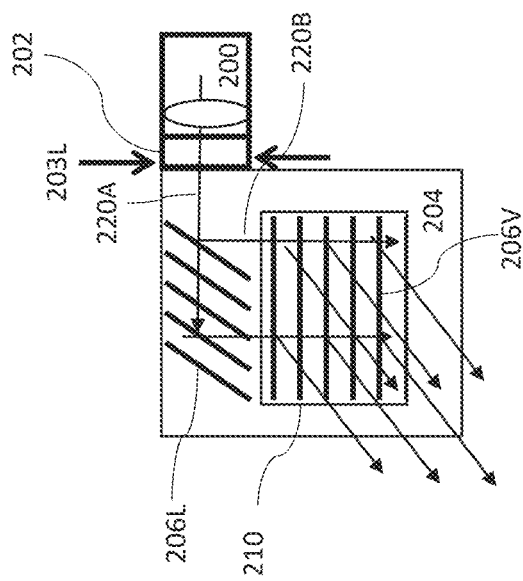
FIG. 1C, described above, is a front view of a conventional near-eye waveguide-based display illustrating the use of first and second sets of partially-reflecting internal surfaces to expand an optical aperture of an image projector in two dimensions.
Figure 1B:
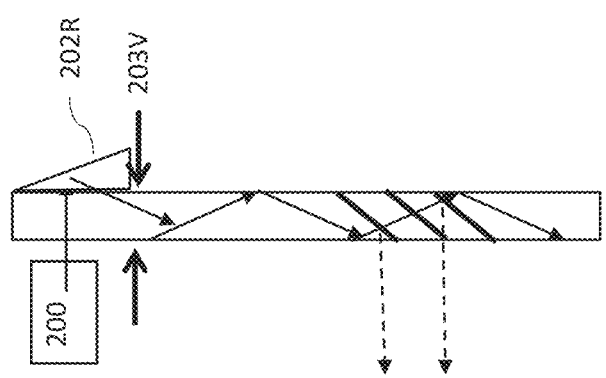
FIGS. 1A and 1B, described above, are schematic side views of a conventional near-eye waveguide-based display illustrating two geometries for coupling-in of image illumination into the waveguide.

By way of introduction, in the context of near-eye displays of the sort illustrated in FIG. 1C, it has been found that particularly advantageous geometrical properties, and in particular, minimization of the dimensions required for a given angular field of view, may be provided by injecting image illumination into the waveguide at "shallow angles", meaning that all of the image illumination is incident on only one side of both the first and the second sets of facets. Typically, in shallow angle implementations, at least part of each image lies within about 15 degrees, and more preferably within about 10 degrees, from the plane of the external surfaces of the waveguide. This results in a shortened light path from the image projector to the observer's eye, and hence also enables reduced size of the optical components for a given angular field of view. The present invention relates to a number of aspects which facilitate shallow-angle implementations of such a display, which presents certain design challenges, particularly with regard to coupling-in configurations. It should be noted, however, that various aspects of the invention described herein are not limited to shallow-angle implementations, and may also be applicable to other implementations.

FIGS. 2A-2C show an angular polar representation of an image as it propagates in the waveguide according to present invention. FIG. 2A shows an isometric view, FIG. 2C a side view and FIG. 2B shows a top view (relative to FIG. 2A) that corresponds to the view from the front of the waveguide.

The waveguide has total-internal-reflection (TIR) boundary circles 228, indicating that images within these circles are not subject to TIR, and will be coupled-out so as to escape the waveguide.

Image 220A1 is coupled into the waveguide and propagates by TIR back and forth to 220A2. These images propagate along a very shallow trajectory along the waveguide where the shallowest part of the image is only 7 degrees from the waveguide plane (shown as angle 221 in FIG. 2C). Facets 224 (equivalent to 206L of FIG. 1C) in this implementation are perpendicular to the waveguide, and therefore reflect images 220A1 and 220A2 directly onto 220B1 and 220B2, respectively. Images 220B1 and 220B2 are coupled by TIR as they propagate down the waveguide. In the second portion of the LOE, facets 226 (equivalent to 206V in FIG. 1C) couple image 220B2 out of the waveguide onto image 220C towards the observer.

By way of one non-limiting example, the illustrations shown herein relate primarily to an image having aspect of 4:3 and diagonal field of 70 degrees injected into a waveguide having refractive index on 1.6. The design illustrated here generates a full image at an eyeball center 35 mm away from the waveguide (including eye-relief, eyeball-radius and margins). Adaptations of these implementations for different fields of view and aspect ratios can readily be implemented by a person ordinarily skilled in the art on the basis of the description herein.

One aspect of the present invention relates to optimization of deployment of partially-reflecting surfaces (or "facets") in the first part of the waveguide responsible for the first dimension of optical aperture expansion. In an earlier patent application published as WO 2020/049542 A1 ("the '542 publication"), it has been suggested to deploy facets selectively within an envelope encompassing the facets which are needed for delivering image illumination to the eye-motion box from which the image is to be viewed.

Figure 1A:
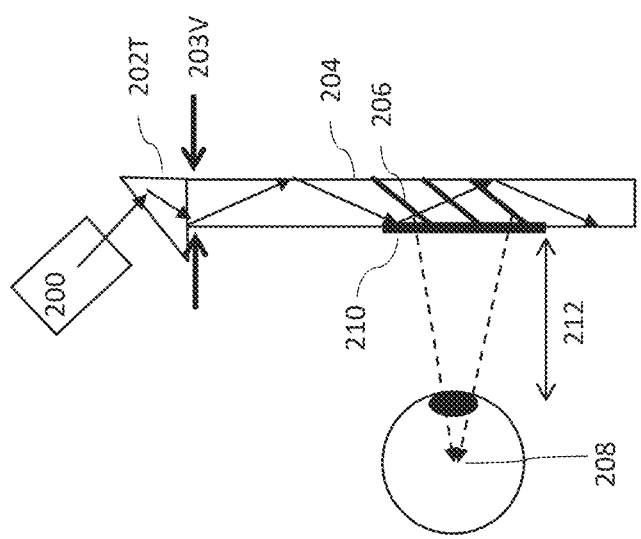
Figure 1D:
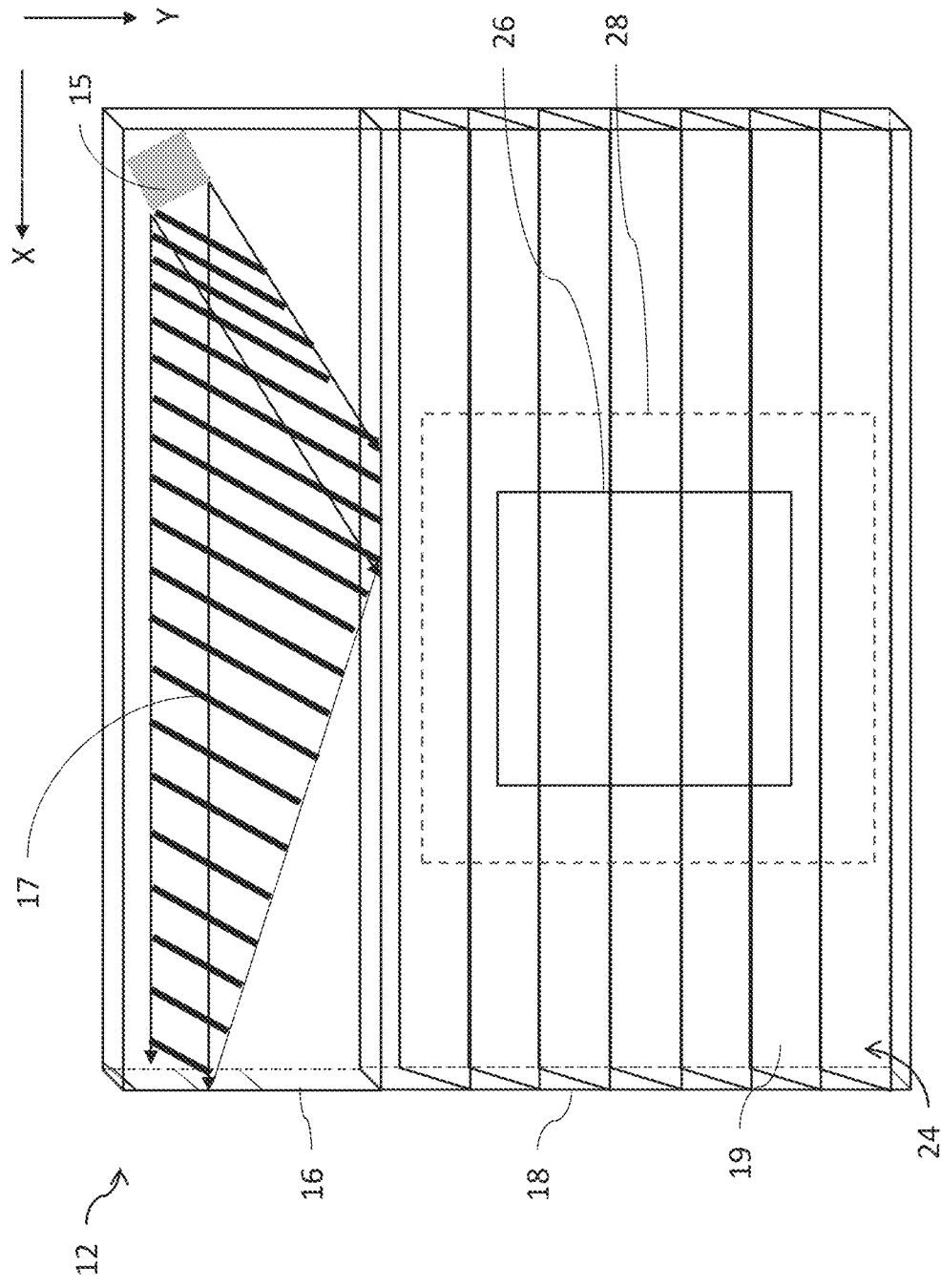
FIG. 1D is a schematic isometric view of a waveguide similar to that of FIG. 1C and corresponding to FIG. 5A of publication WO 2020/049542 A1.
Figure 5B:
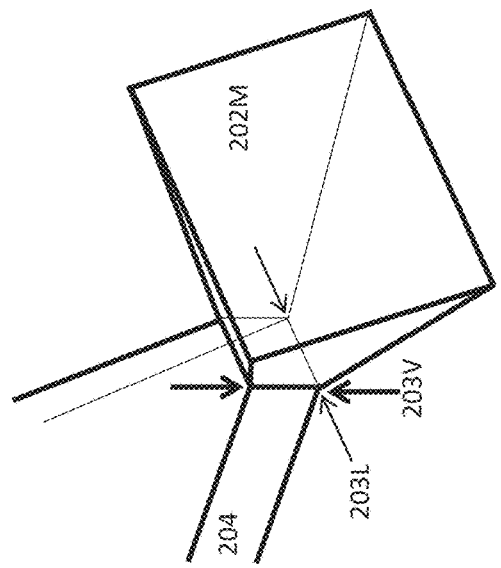
FIG. 5B is a schematic isometric view of the coupling-in prism of FIG. 5A.
Figure 5D:
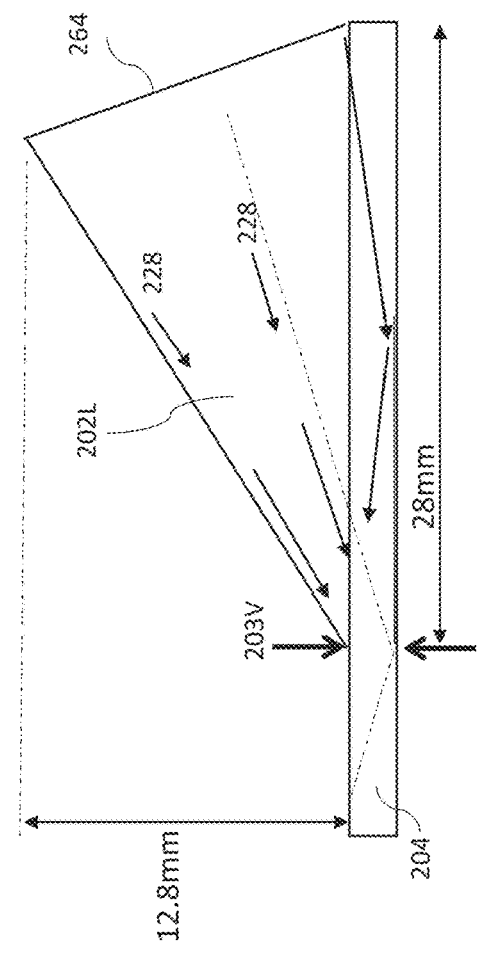
FIG. 5D illustrates a variant implementation of the present invention employing a coupling-in prism which is attached to a major external surface of the LOE.
Figure 5A:
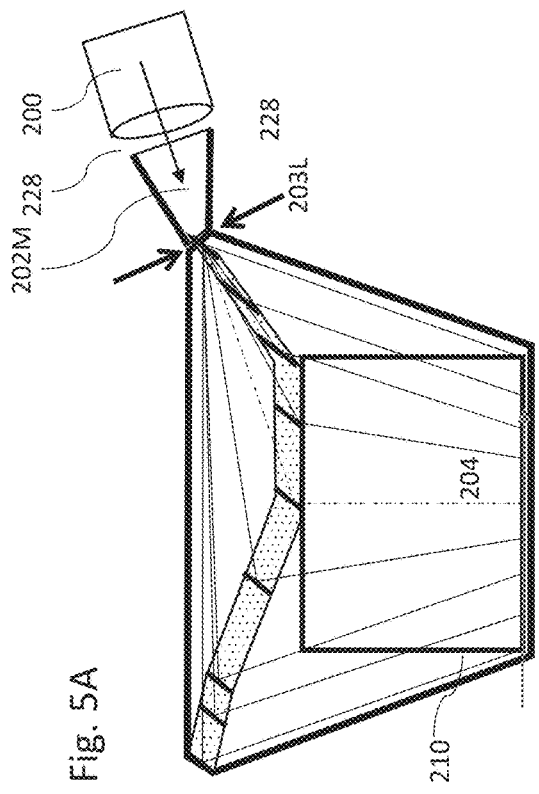
FIG. 5A is a view similar to FIG. 4A illustrating an image projector and a coupling-in prism for introducing image illumination into the LOE.

An example of the resulting deployment of facets is illustrated in FIG. 5A of that publication, which is reproduced here as FIG. 1D. In that implementation, an optical system for directing image illumination injected at a coupling-in region 15 to an eye-motion box 26 for viewing by an eye of a user employs a light-guide optical element (LOE) 12 formed from transparent material having a first region 16 containing a first set of planar, mutually-parallel, partially-reflecting surfaces 17 having a first orientation, and a second region 18 containing a second set of planar, mutually-parallel, partially-reflecting surfaces 19 having a second orientation non-parallel to the first orientation. A set of mutually-parallel major external surfaces 24 extend across the first and second regions such that both the first set of partially-reflecting surfaces and the second set of partially-reflecting surfaces are located between the major external surfaces. The second set of partially-reflecting surfaces 19 are at an oblique angle to the major external surfaces 24 so that a part of image illumination propagating within the LOE by internal reflection at the major external surfaces from the first region into the second region is coupled out of the LOE from a coupling-out region 28 towards the eye-motion box 26. The first set of partially-reflecting surfaces 17 are oriented so that a part of image illumination propagating within the LOE by internal reflection at the major external surfaces from the coupling-in region is deflected towards the second region.

According to the teachings of the '542 publication, certain parts of the first region 16 of the LOE outside the envelope of useful facets are implemented as an optical continuum (i.e., without partially reflecting internal surfaces), thereby reducing unwanted "ghost" reflections. Within the convex polygonal envelope, however, the facets are implemented as filling the entire width of the convex polygon, as illustrated in the drawing. As a result, the part of the field of view reflected from the facets located on the side distal from the coupling-in region pass through a long series of partially-reflecting facets before reaching the facets which deliver that part of the field of view to the eye-motion box.

According to one aspect of the present invention, the regions of facets required to deliver a given field of view to the eye-motion box is further refined to generate a concave polygon defining the required facet locations, thereby removing parts of the intermediate facets which would otherwise unnecessarily attenuate the image illumination directed to provide the part of the field reflected by facets furthest from the coupling-in region.

Figure 3E:
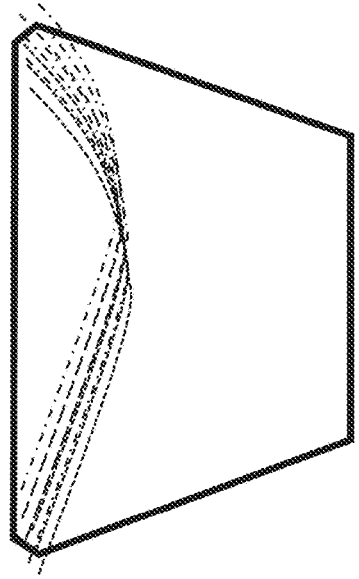
FIG. 3E is a view similar to FIG. 3C where the loci are further increased according to the geometrical requirements resulting from using an obliquely-angled first set of facets.

Thus, as illustrated in FIG. 3D, the first set of partially-reflecting surfaces, here labeled 206L, includes a first partially-reflecting surface 17A proximal to the coupling-in region 240 so as to contribute to a first part of a field of view (FOV) of the user as viewed at the eye-motion box, a third partially-reflecting surface 17C distal to the coupling-in region so as to contribute to a third part of the FOV of the user as viewed at the eye-motion box, and a second partially-reflecting surface 17B lying in a medial plane 22 between the first and the third partially-reflecting surfaces so as to contribute to a second part of the FOV of the user as viewed at the eye-motion box. In the example illustrated in FIG. 3D, facet 17A contributes to the right side of the FOV, facet 17C contributes to the left side of the FOV, and facet 17B contributes to the central region of the FOV. It is a particular feature of this aspect of the present invention that the second partially-reflecting surface 17B is deployed in a subregion of the medial plane 22 such that image illumination propagating from the coupling-in region to the third partially-reflecting surface (arrow 23) and contributing to the third part of the field of view of the user as viewed at the eye-motion box passes through the medial plane 22 without passing through the second partially-reflecting surface 17B.

In this context, it should be noted that the terms "proximal", "distal" and "medial" are used herein to denote relative position with respect to a point or region of interest, in this case the coupling-in region 240, and refer to facets which are relatively closer (proximal) to, or relatively further (distal) from, the coupling-in region, or which are "towards the middle" (medial), without necessarily denoting the closest, furthest or central facet according to any specific geometrical definition.

A conceptual explanation will now be provided in order to facilitate a better understanding of the geometrical optics considerations which lead to the preferred design parameters for a given implementation of this aspect of the present invention. It should be noted that this explanation is given for informational purposes only, but that the utility of the invention as claimed is not dependent on the accuracy of any aspect of this explanation, and that effective and advantageous implementations of the claimed invention may alternatively be implemented by empirical methods.

FIG. 3A shows front view of few selected beams of the projected image having parameters corresponding to the exemplary FOV mentioned above. Solid lines represent beam of an image injected into the waveguide laterally and dashed lines represent beams after lateral aperture expansion and reflection as they propagate vertically. It should be noted throughout this document that any example describing lateral expansion followed by vertical expansion can be changed to vertical expansion followed by lateral without inherent change in structure. This can be exemplified simply by rotating the above figures by 90 degrees.

All beams are transmitted from entrance pupil of the coupling-in region 240. The beams propagate within the waveguide until being reflected by set of parallel embedded reflectors 206L (facets). The facets in this diagram are assumed to be perpendicular to the external faces of the waveguide. Therefore, every line (solid followed by dashed) represents a different lateral section of the projected image field onto the observer's eye. The vertical field of every section is illuminated by plurality of overlapping beams (as viewed from front) propagating at different angles inclination (into the page) that are reflected by TIR (such internal reflection being illustrated in the side view of FIG. 1A).

For the purpose of simplifying the geometrical analysis, assume first that only the eyeball center 208 needs to be illuminated with the entire lateral field. This can theoretically be achieved by having infinitely small lateral facts 206L placed infinitely close to each other along the trajectory represented as 244A in FIG. 3B. However, the requirement to accommodate lateral shifting of the eyeball center (for example due to variation of interpupillary distance between users) dictates a shift of curve 244A. FIG. 3C shows schematically the curve for three lateral positions of the eyeball 208 as 244A, 244B and 244C. To cover the required width of the eye-motion box, widening of the facets is required.

Other Requirements Include:
 There is a finite minimum distance between the facets (i.e., they cannot be infinitely close);
 The aperture size cannot be too small;
 The facets must project continuous reflections towards the vertical expansion facets 206V.

FIG. 3D shows the finite size facets 206L appropriate for the above conditions. The length of the facets can vary according to the facet spacing and other optical parameters such as refractive index, the size of the projected field and the location of image injection 240.

In the case where the lateral expanding facets 206L are at an oblique angle to the major external surfaces of the LOE, the image is injected into the waveguide rotated relative to the axes of the waveguide, and the reflection from facets 206L rotates the image to the required orientation. Consequently, the curve for projecting onto the center of eyeball 208 will look like FIG. 3C, and when additionally considering the spread required for the lateral eye-motion box, it will look like FIG. 3E, that shows further multiplication of curves 244A, 244B and 244C. This therefore requires somewhat wider facets than a corresponding implementation with orthogonal facets for the first expansion.

Figure 3F:
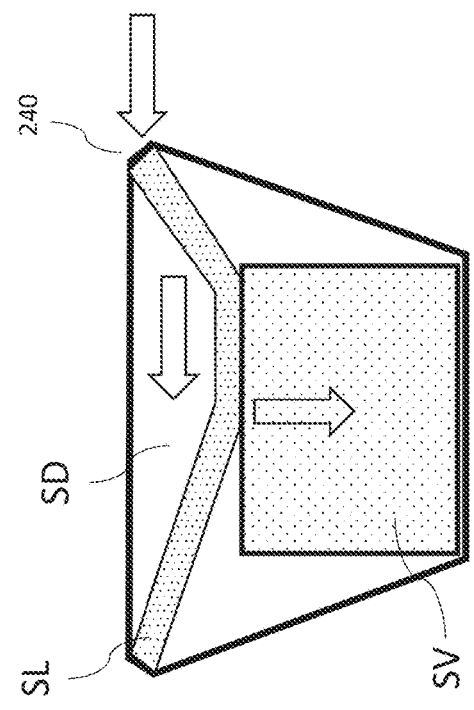
FIG. 3F is a schematic representation of the LOE of FIG. 3D where the facet-containing regions are demarcated by corresponding polygons, with the first set of facets demarcated by a concave polygon.

Certain advantages of this aspect of the present invention can be better appreciated with reference to FIG. 3F. The area of the lateral expanding facets is described at SL while the area of the 'depression' above it is SD and the vertical expanding facets area is SV. Due to the concave polygon form of SL, the light propagating laterally from the entrance 240, propagates mostly in transparent area SD before being reflected downward in SL. The propagation in a transparent area reduces the loss of image illumination by reflection to undesired directions, thereby improving waveguide efficiency. Furthermore, there are no undesired reflections of the scenery by facets from SD, thereby substantially reducing glints and ghost images from the waveguide.

One possible method for producing the lateral expansion section SL with 'depression' SD is shown in FIGS. 3G and 3H. The sections including SD and SL are subdivided into blocks as indicated by heavy outlines in the region designate 300 in FIG. 3G. FIG. 3H illustrates how this structure can be assembled from a transparent prism 302 having appropriate face angles together with three plates having appropriate facet angles (shown as lines along the plates) that fit together against the corresponding surfaces of prism 302 and against each other to form the assembled structure as illustrated. This structure is combined with additional clear prisms and the vertical-expansion portion of the LOE to generate the overall structure.

Optionally, the combined prism and plates can be sliced, or can first be attached to another stack to be sliced together to generate the waveguide with all its sections.

Figure 4C:
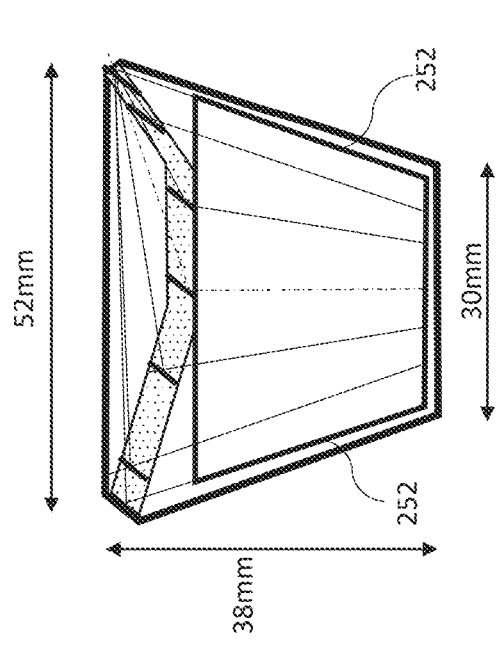
FIG. 4C is a view similar to FIG. 3A illustrating exemplary dimensions for an implementation generating a trapezoidal field of view with angular dimensions as illustrated in FIG. 4D.
Figure 4D:
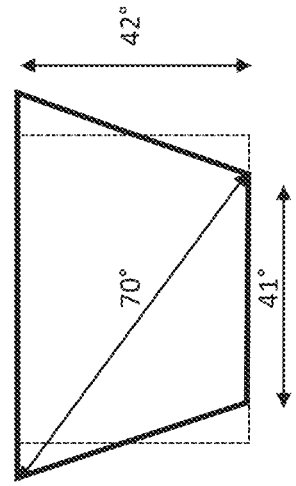
FIG. 4A is a view similar to FIG. 3A illustrating exemplary dimensions for an implementation generating a rectangular field of view with angular dimensions as illustrated in FIG. 4B.
Figure 4A:
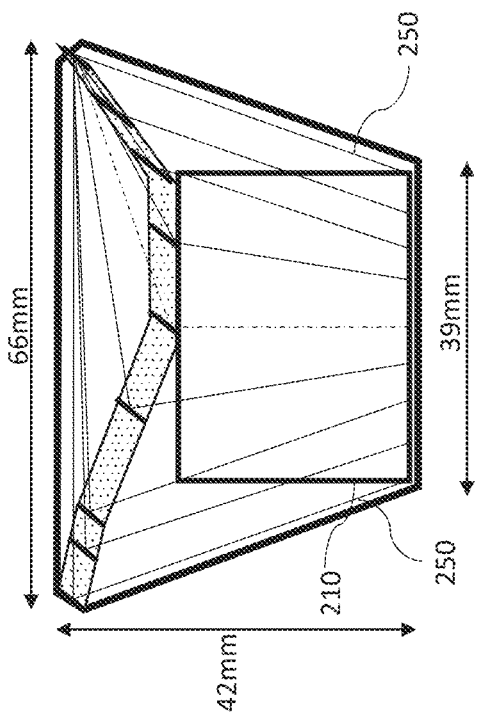
Figure 4B:
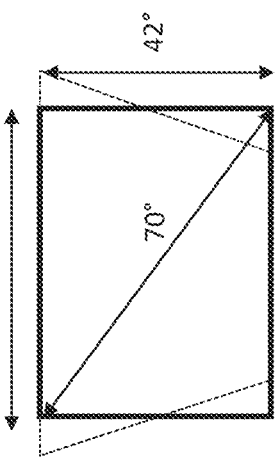

The size of the waveguide as described above is shown in FIG. 4A, resulting in an image field angular size as shown in FIG. 4B. It is noted that the most laterally-spread beams 250 illuminate only the lower corners of the image, thereby requiring a large waveguide area while contributing only to a small part of the image. In certain applications, it may be acceptable, or even advantageous, to provide a non-rectangular FOV, and in particular, a trapezoid image field, as illustrated in FIG. 4D. In this case, there is shown an image which has the same total area as FIG. 4B (which is shown with dashed lines in FIG. 4D for comparison), but distributed as a trapezoid, with a wider field at the top than at the bottom. The LOE to generate this FOV is illustrated in FIG. 4C, with corresponding dimensions. In this case, lateral edge light beams 252 illuminate vertically all the field (with corresponding different angles into the paper), therefore making much more efficient use of the LOE size. Consequently, the size of the waveguide of FIG. 4C is substantially smaller than that of FIG. 4A, as illustrated by the exemplary dimensions for the same overall FOV area. The subsequent description with illustrate further aspects of the invention in the non-limiting exemplary context of the configuration of FIG. 4A, but it should be appreciated that configurations such as that of FIG. 4C may be implemented using the same principles.

Figure 5C:
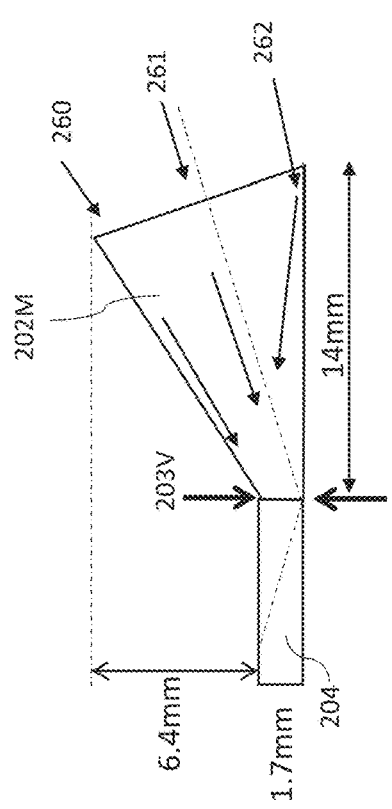
FIG. 5C is a side view of the coupling-in prism of FIG. 5A illustrating the required dimensions for an exemplary implementation of the present invention.

Injecting a shallow image into a waveguide requires a relatively large coupling prism 202. FIG. 5A shows the waveguide with lateral entrance pupil 203L and coupling prism 202M to scale. The image projector 200 is illustrated schematically. FIG. 5B is an isometric view of the coupling prism 202M with vertical aperture 203T and lateral aperture 203L, both located at same plane so as to define a rectangular aperture. FIG. 5C illustrates a side view of coupling prism 202M which, for a 1.7 mm thick waveguide, requires a 14 mm-long coupling prism designed to couple light from all field angles into the waveguide. Part of the beams 262 are reflected from the bottom of the prism before entering through pupil 203V into waveguide 204. The height of prism 202M above the waveguide is 6.4 mm, which is acceptable in many applications. However, the size of projector 200 that is need to inject the image through prism 202M also takes space and volume and, in many applications, will not be acceptable.

The prism 202M (and others described herein) preferably has a lower face that is parallel to the waveguide faces for consistent reflection, while the upper and side faces do not need specific optical properties, so their shapes can be other than the ones shown in these figures.

FIG. 5D illustrates an alternative architecture where a coupling prism 202L is located above the waveguide, and where the entrance pupil is the prism face 264. In this case, the prism and the required projector are larger than in FIGS. 5A-5C, making this configuration non-optimal.

One option for reducing the overall dimensions of the coupling arrangement and image projector is illustrated in FIGS. 6A and 6B, which illustrate integration of the image projector with the coupling prism. A scanning laser image projector is illustrated here by way of a non-limiting example, but the same principles can be implemented using an image projector based on another type of image generator, such as employing an LCOS (liquid crystal on silicon) spatial light modulator, or a micro-LED image generator.

FIG. 6A shows a coupling prism 202P attached to waveguide 204. FIG. 6B shows a side view of the integrated (embedded) image projector. Laser 270 directs a polarized beam onto scanning mirrors 272 that scan intermediate image plane across a micro-lens array (MLA) or diffuser 274. The scanned light passes through the diffuser and is reflected from polarizing-beam-splitter 276 onto collimating reflecting lens 278 (combined with a quarter-wave plate). The reflected light passes through PBS 276 into coupling prism 202P. This coupling prism thus serves also as part of the PBS 276. Part of the light passes directly into the waveguide and part is reflected by the lower face 279 before entering the waveguide, thereby filling the aperture of the waveguide with both the image and its conjugate.

Parenthetically, wherever a PBS arrangement is illustrated herein as sequentially reflecting and then transmitting light, or the reverse, it will be understood that a half-wave plate (for single transmission) or a quarter-wave plate (for double transmission) is appropriately placed to achieve rotation of the polarization as required for the functionality described. The polarization-rotating elements will not be mentioned in each case.

Figure 7B:
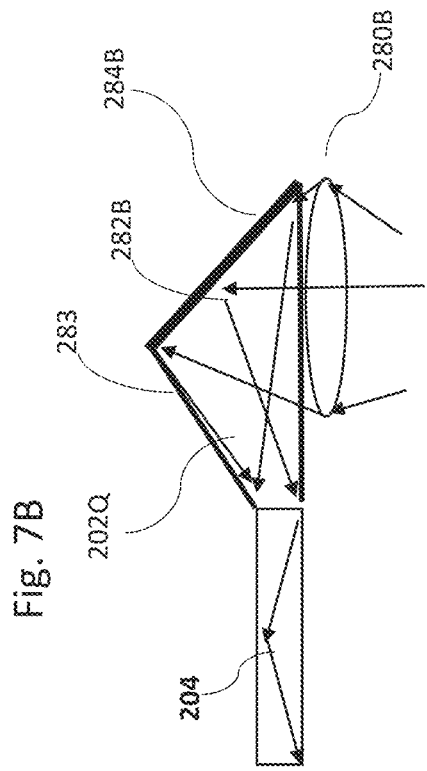
FIG. 7B is a view similar to FIG. 7A in which the inclined reflector coupling arrangement and the coupling-in prism are combined and reduced in size.
Figure 7D:
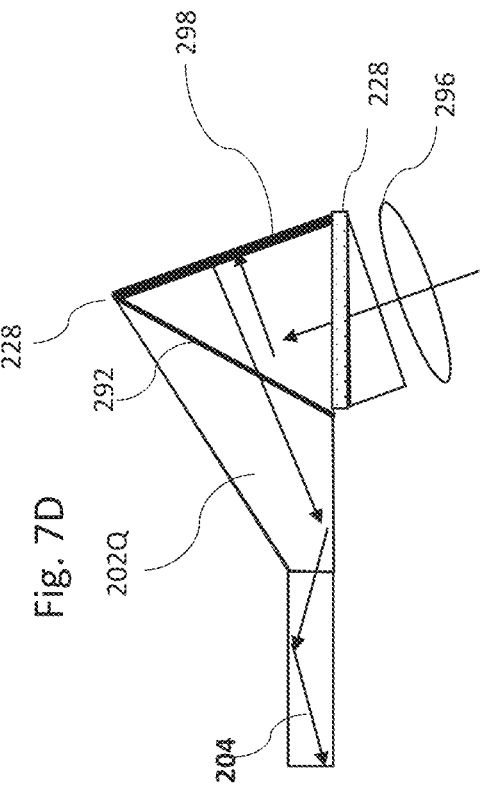
FIG. 7D is a view similar to FIG. 7C but using external collimating optics.
Figure 7A:
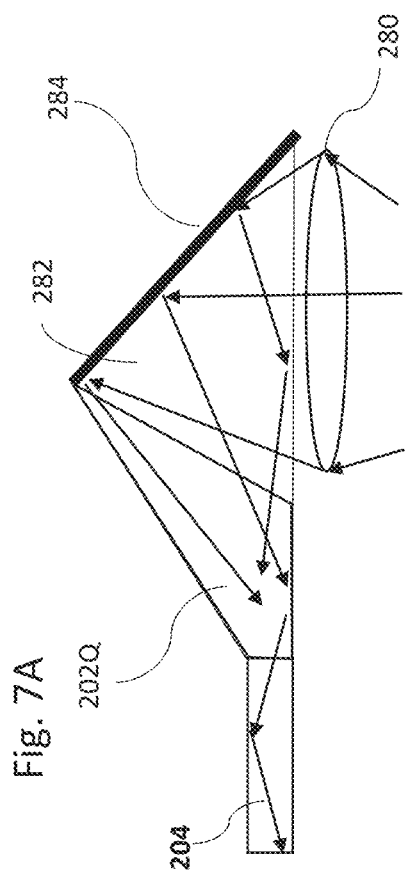
FIG. 7A is a schematic side view of a coupling-in arrangement employing an inclined reflector coupling arrangement and a coupling-in prism, and employing external collimating optics.

Alternative architectures for combining the image projector with the coupling prism are shown in FIGS. 7A-7D. FIG. 7A shows light from image generator (not shown, but as before, may be a scanned laser, LCOS or other) being collimated by a refractive lens 280 (beams in diagram from different fields points therefore not parallel), entering prism section 282 and being reflected by mirror 284 into prism section 202Q and into waveguide 204. In this configuration, prism sections 282 and 202Q can be combined to a single prism, as illustrated in FIG. 7B. Furthermore, there is no need for the light to be polarized in this case.

The structure of FIG. 7B employs an equivalent reflector architecture to FIG. 7A, but with smaller prism. Here the prism length is of the order of 14 mm, similar to prism 202M in FIG. 5C for similar output parameters. However, the height will be only 3.2 mm, which is half that of 202M. As in all of the prisms described herein, the upper (non-reflecting) face of the prism 283 is preferably absorbing. It is drawn here according to the upper beam 260 (defined in FIG. 5C), but since the upper surface is not optically significant, it can be higher and/or have other shapes.

This prism can also be provided with a coupling configuration including a lower refractive index part at its lower face equivalent to elements 286 or 228 described below with reference to FIGS. 7C and 7D. The interface can be used to attached to a PBS as an image projector.

Figure 7C:
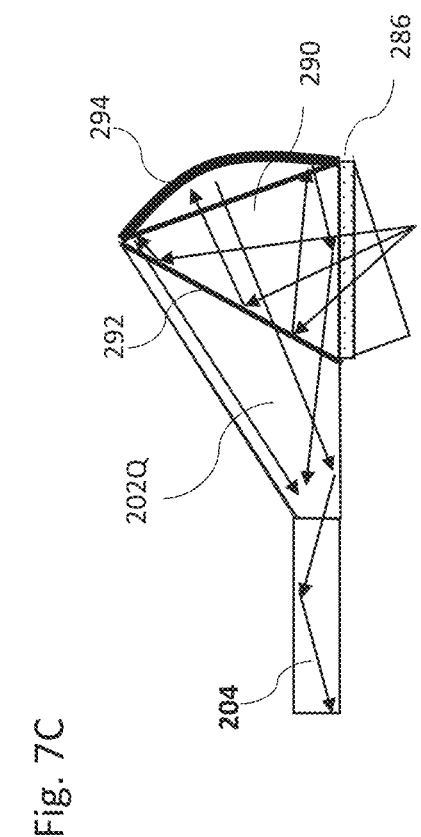
FIG. 7C is a view similar to FIG. 7A employing a polarized beam splitter and integrating reflective collimating optics into the reflective coupling-in arrangement.

FIG. 7C shows injection of diverging polarized light corresponding to an image (originated from a MLA, scanning laser, LCOS or other image generator) passing through interface 286 into PBS section 290 and reflected by PBS 292 onto reflecting collimating lens 294. The reflected collimated light passes through PBS 292 into coupling prism 202Q and into the waveguide 204. In this architecture some of the light is reflected by the lower section of prisms 290 and 202Q, therefore these surfaces need to have good image quality and to be continuous. The interface 286 can be air, but also a low refractive index medium (relative to prism 290), so that TIR will occur for light reflected from 294.

FIG. 7D shows an arrangement similar to FIG. 7C, but with external optics (e.g., a refractive lens 296) that collimates the light and a flat reflector 298.

Figure 8A:
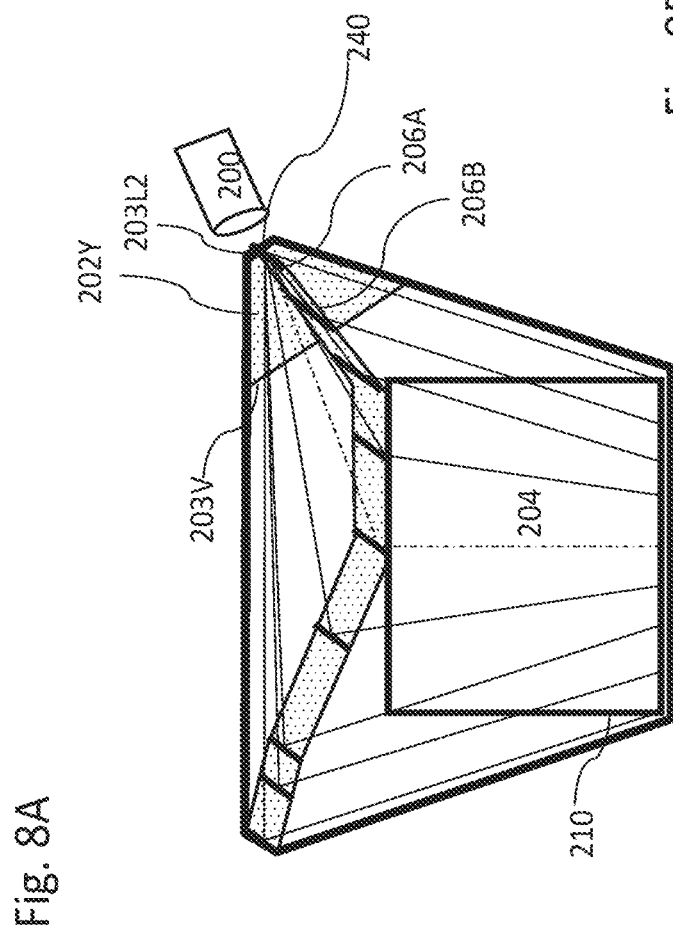
FIG. 8A is a view similar to FIG. 5A, but where a coupling-in prism is integrated with part of the waveguide.
Figure 8B:
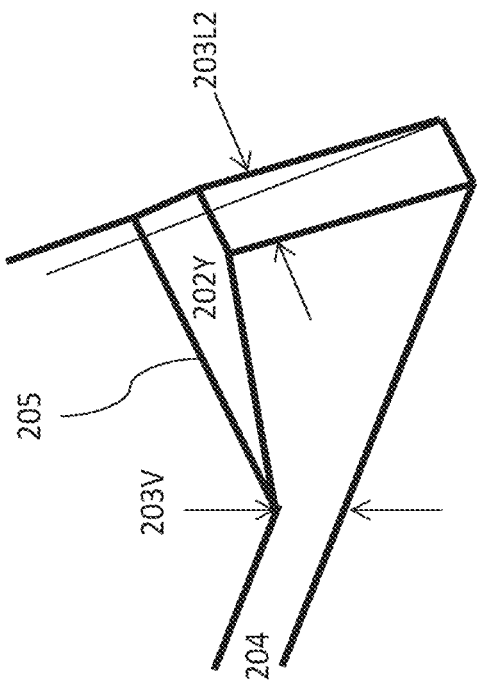
FIG. 8B is a schematic isometric view of the coupling-in prism of FIG. 8A.

Turning now to FIGS. 8A and 8B, these illustrate an alternative configuration according to a further aspect of the present invention in which a coupling prism is integrated with part of the waveguide instead of as an extension shown in FIG. 5A. FIG. 8A shows coupling prism 202Y (dotted area) on top of waveguide 204. Image generator 200 is therefore located closer to the waveguide and has a smaller size. All of the light rays propagating in the waveguide continue to emerge from point 240, therefore the lateral aperture 203L2 is located at same place as the previous embodiments. However, the vertical aperture 203V is here located at the end of the prism, at a transition line 205 where the thickened portion of the prism meets with the major external surface which defines the main portion of the LOE. FIG. 8B shows the shape of the coupling prism in an isometric view. The two apertures 203L2 and 203V2 have same width as previously described but because of the separation of location the prism becomes vertically elongated at 203L2.

It is apparent from FIG. 8A that some of the facets (here represented as 206A and 206B) are located within the prism. A number of possible implementations of these facets in prism 202Y are illustrated in FIGS. 9A-9F. For clarity of presentation, the facets lying within the main part of the LOE have been omitted here.

Figure 9D:
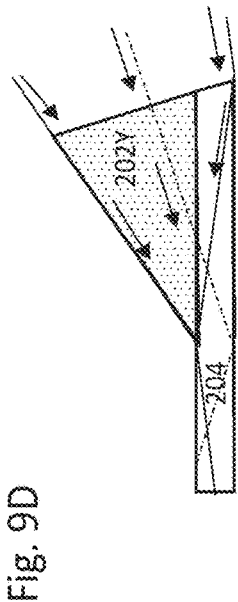
FIG. 9D is a schematic side view of the coupling-in prism of FIG. 8A implemented as a coupling-in prism bonded to one of the major external surfaces of the LOE.
Figure 9E:
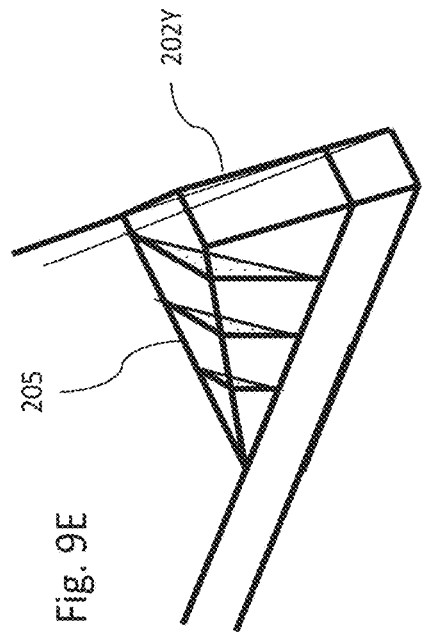
FIGS. 9E and 9F are schematic isometric views of the coupling-in prism of FIG. 9D showing inclusion of full or partial partially-reflective facets, respectively, within the prism.
Figure 9F:
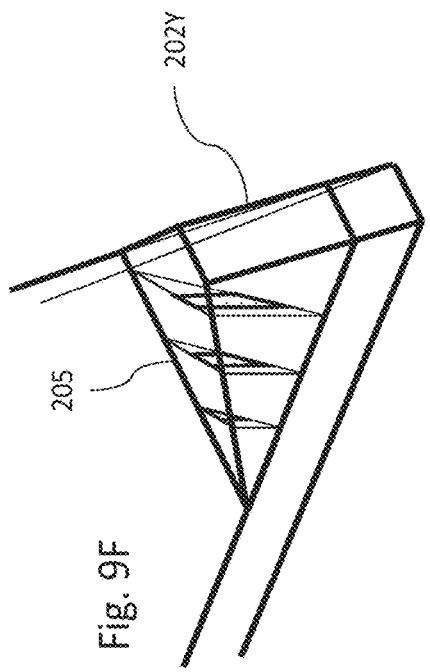
Figure 9A:
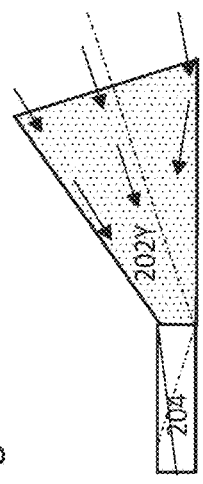
FIG. 9A is a schematic side view of the coupling-in prism of FIG. 8A implemented as a coupling-in prism bonded to the LOE at an edge surface of the LOE.
Figure 9B:
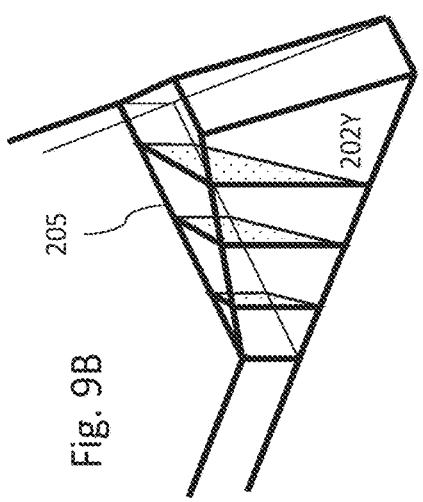
FIGS. 9B and 9C are schematic isometric views of the coupling-in prism of FIG. 9A showing inclusion of full or partial partially-reflective facets, respectively, within the prism.
Figure 9C:
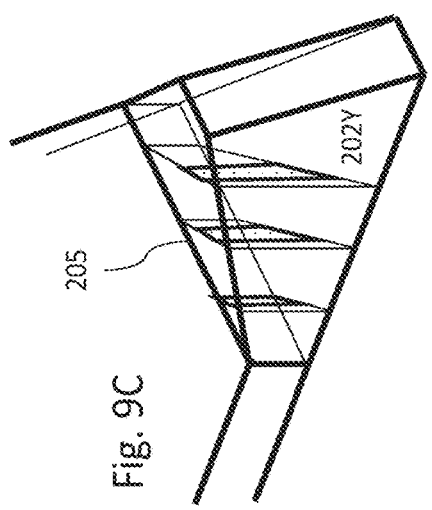

FIG. 9A shows prism 202Y attached to the edge of the waveguide, and FIG. 9B shows in isometry the placement of the facets in the prism. However, since there is no need for the facets to reflect light across the entire width of the prism (as can be seen in FIG. 8A, which illustrates that the required width of facets 206A and 206B is limited), FIG. 9C shows the reflecting parts (shaded area) to be only a part of the corresponding plane within the prism.

FIG. 9D shows an alternative configuration where prism 202Y is formed by attaching a correspondingly-shaped block on top of waveguide 204 (facets in 204 are not shown). In FIG. 9E, the same structure is illustrated with facets across the entire cross-section of 202Y above the LOE thickness, while in FIG. 9F, the reflective area is implemented only as the shaded region, corresponding to only the optimal required area.

In certain cases, it is possible to combine the earlier-mentioned integrated image projector (FIGS. 6A-7D) together with the LOE-integrated coupling prism of FIGS. 8A-9F. Certain geometrical considerations in such an implementation are illustrated with reference to FIGS. 10A-10D.

Figure 10B:
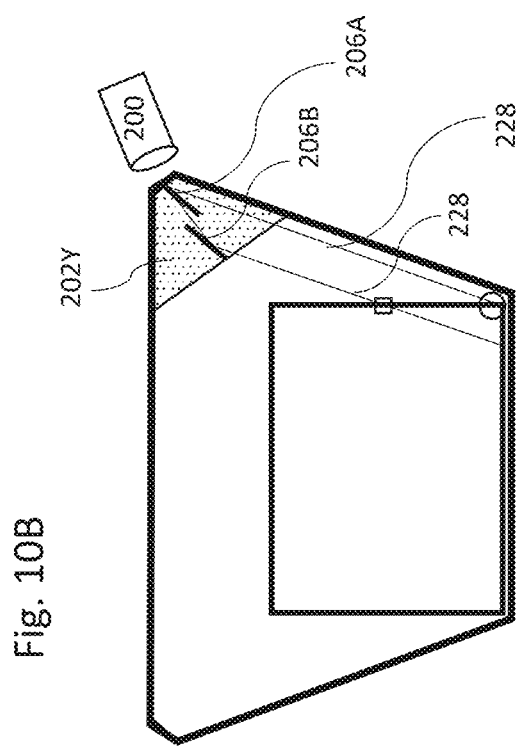
FIG. 10B is a partial view similar to FIG. 4A illustrating the image light propagation paths corresponding to the two points of FIG. 10A.
Figure 10A:
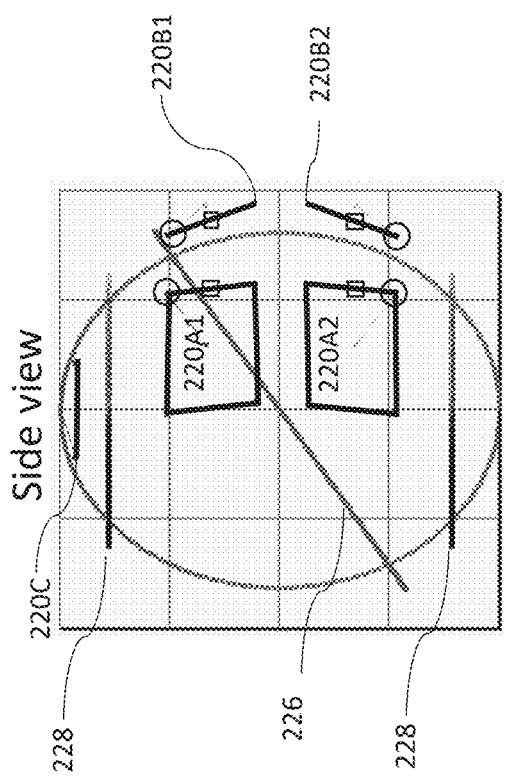
FIG. 10A is a side view of an angular representation similar to FIG. 2C illustrating two specific points within a field of view of the projected image.

FIG. 10A shows a side view of an angular distribution equivalent to FIG. 2C, but with markings of two field points associated with facets 206A (circle) and 206B (square). Same field points are shown in FIG. 10B.

Figure 10D:
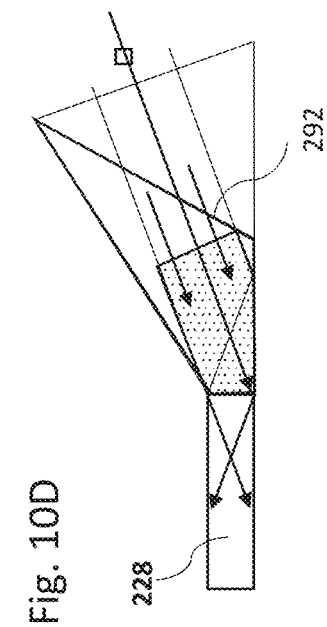
FIGS. 10C and 10D are side views of a coupling-in prism indicating the injection angle of these two field point, respectively, and the corresponding desired location of the first reflective facet they should encounter.
Figure 10C:
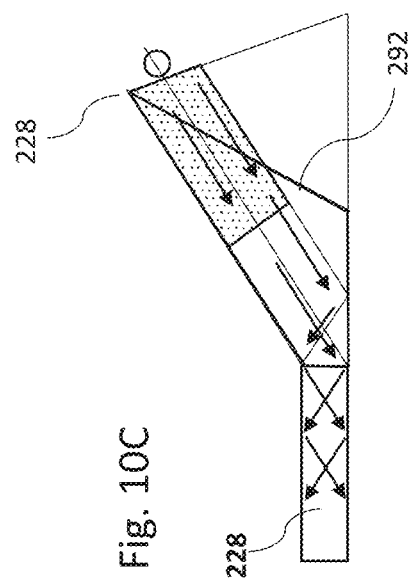

FIG. 10C shows a side view of the waveguide-overlapping coupling prism where the shaded area represents a preferred location for the facets associated with 206A and FIG. 10D shows the preferred location for the facets for 206B. The PBS 292 is shown here for reference. It is apparent that the preferred location for the facets in the overlapping coupling prism should be above the PBS plane. Implementation of facets at before the PBS plane would cause distortion to the transmitted image.

FIGS. 11A-11D are side views illustrating implementations of facets to coupling prisms incorporating projector optics. FIGS. 11A, 11B and 11C show integration of facet section 202T (marked as a shaded area) into configurations which are otherwise similar to those of FIGS. 7A, 7C and 7D, respectively. The 3D representation remains as was described with reference to 10A-10D.

FIG. 11D parallels FIG. 6B, and illustrates that, where the PBS orientation is opposite, the facet section 202T2 is best implemented only partially after the PBS plane. The coupling prism will therefore extend slightly further outside lateral aperture plane 203L2 (illustrated in FIGS. 8A-8B).

Parenthetically, the deployment of facets 202T2 as illustrated in FIG. 11D will also be suitable for configurations employing the waveguide architecture of FIGS. 4C and 4D.

Turning now to FIGS. 12A-12D, as an alternative to the production process illustrated above with reference to FIGS. 3G-3H, the facet patterns of FIG. 3D or 3F can be produced based on stacking and slicing selectively-coated plates. In this case, the plates are coated in a predefined pattern as shown in FIG. 12A, which shows a set of plates shown from the front 300F that are coated in predefined patterns 302F. These patters have width and position according to required coated facets shown in 112. These patterns are preferably produced by masking the uncoated part of the waveguide while coating. It is also possible to coat only the other part of the face of the plates in 304F by coating a non-reflective coating in order to maintain flat surface or to preserve the phase of transmitted light through 304 to be equivalent to phase of transmitted light through 302.

FIG. 12B illustrates a stack formed by bonding together the partially coated plates, where the dashed line shows the slicing planes across the stack. FIG. 12C shows one slice having side view of the plates 300S and the reflective patterns 302S. Another slice is done as shown by the dashed lines in FIG. 12C to generate the final upper section of FIG. 12D, corresponding to the upper part of the LOE of FIG. 3D.

It should be noted that the order of the slicing may be changed. It will also be appreciated that the illustrations of FIGS. 12A-12D are highly schematic, and that a larger number of plates are typically used.

Figure 13:
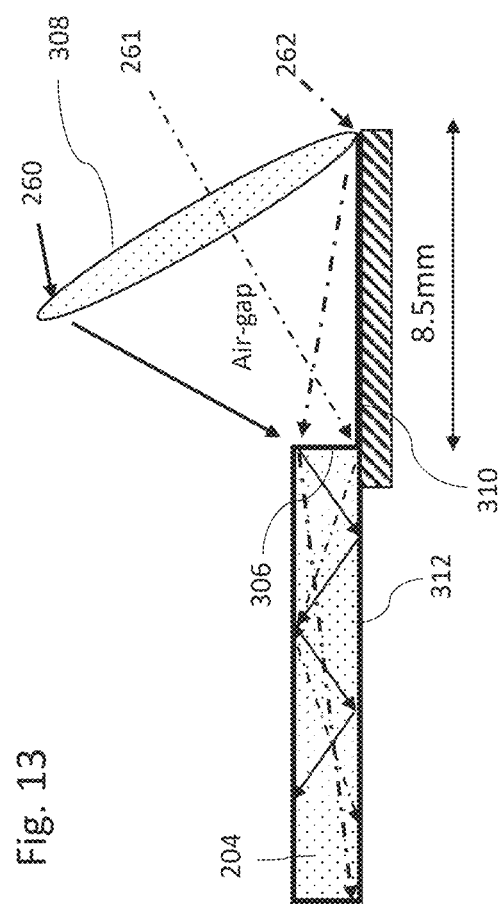
FIG. 13 is a schematic side view of a coupling-in configuration employing an air gap and a mirror surface.

Reducing the refractive index of the coupling prism 202M can also be used for reducing prism size and thereby making the system more compact. FIG. 13 illustrates an extreme case of this concept where 202M is replaced with air-gap and mirror 310 that is in-plane with lower waveguide plane 312. The light from projecting optics 308 is directed onto perpendicular entrance 306 to waveguide 204 and onto mirror plane 310. Because of the lower refractive index of the air-gap, angles of the beams change and consequently the length of the mirror is shorter than length of prism 202M. The angle of the lower beam 262 is now 11.5 degrees instead of 7 before. Consequently, the mirror length is now 8.5 mm instead of 14 mm in FIG. 5C. As the beam enter the waveguide its angular distribution is as in FIG. 5C. The mirror can overlap the waveguide for mechanical attachment.

A conceptually-similar approach of employing low refractive index material can be implemented using a low refractive index glass prism. When using a low refractive index glass prism, it is possible to compensate some of the dispersion generated by the angle in incidence of the light entering face 306.

Figure 14B:
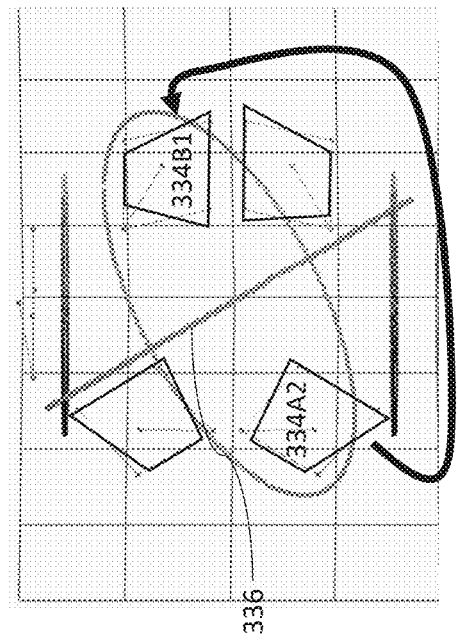
FIGS. 14A and 14B are views similar to FIGS. 2A and 2C, respectively, showing the image propagation through the optical system in the case of an obliquely oriented first set of partially-reflecting surfaces.
Figure 14A:
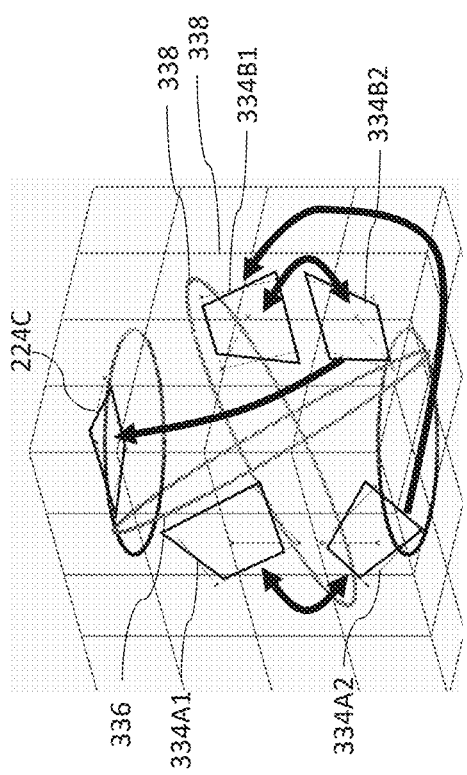

In the embodiments detailed thus far, the facets employed 206L employed for the first set of facets have been orthogonal to the major external surfaces of the LOE, as detailed in FIGS. 2A-2C. In an alternative set of embodiments illustrated with reference to FIGS. 14A-14C, the first set of facets is implemented using obliquely angle facets 336. FIG. 14A shows an isometric angular representation of such system used to transmit shallow angle images, while FIG. 14B shows a corresponding partial side view of the angular representation. This non-limiting example employs a trapezoidal FOV, equivalent to the image for minimal size shown in FIGS. 4C and 4D, although this structure could clearly also be used for a rectangular FOV.

In this architecture the initial laterally propagating image 334A1 is coupled with 334A2 by TIR reflections. Only 334A2 is redirected towards the second region of the LOE 334B1 by tilted facets 336, which are at an oblique angle relative to waveguide faces. Facets 336 are preferably coated with multilayer dielectric coatings, as is known in the art, to provide the desired degree of partial reflectivity for the range of incident angles corresponding to image 334A2 (as in all of the above embodiments), while being primarily transparent to the range of incident angles corresponding to image 334A1, so as to minimize energy losses and formation of undesired reflections. The image 334B1 is coupled to 334B1 by TIR as it propagates at shallow angle along the second region of the waveguide. Image 334B2 is then coupled out to 334C by facets 338 (shown only in FIG. 14A), in a manner equivalent to facets 226 of FIGS. 2A-2C.

Figure 14C:
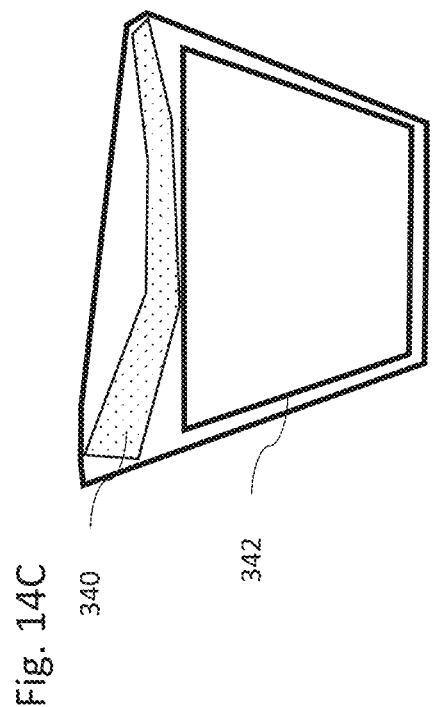
FIG. 14C is a view similar to FIG. 3F for an implementation of the LOE optimized for the image propagation described in FIGS. 14A and 14B.

FIG. 14C illustrates the waveguide footprint that is equivalent to FIG. 4C, where shaded region 340 is the optimal area for the first set of facets 336, and area 342 is the optimal area for output coupling facets 338.

Figure 15:
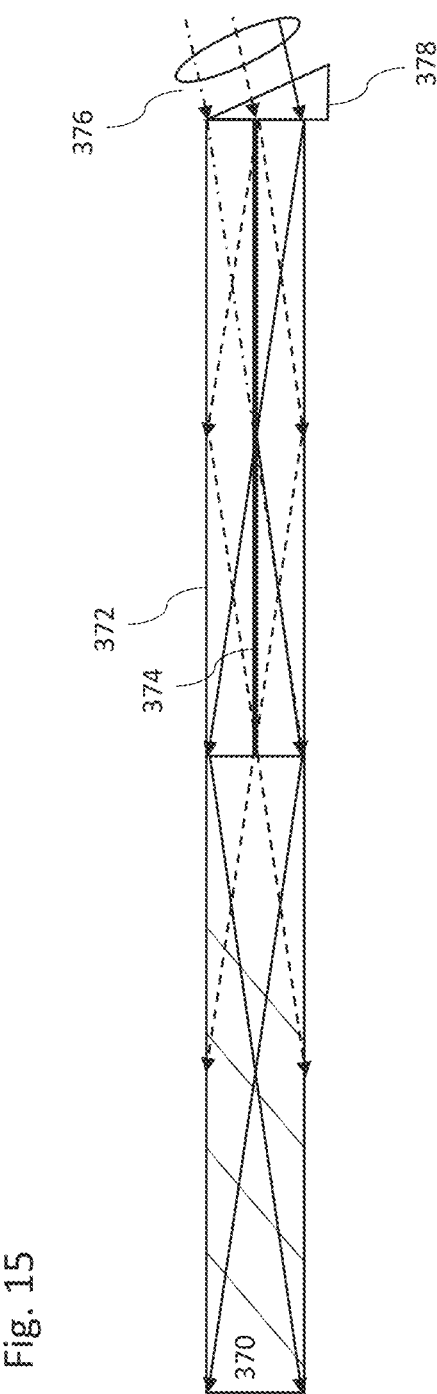
FIG. 15 is a schematic side view of a side coupling-in configuration employing a beam-splitter to fill the waveguide with the injected image and its conjugate.

The various coupling-in prism arrangements described above are configured to couple-in to the LOE both an image and its conjugate to "fill" the waveguide with the image. An alternative approach particularly attractive for shallow-angle image injection into the waveguide is direct injection of image into the waveguide, as illustrated in FIG. 15. In order to fill waveguide 370 with the injected image and its conjugate, waveguide 370 has a coupling region 372 that has a partial reflector 374 along a center plane of the waveguide. The partial reflector 374 is most preferably implemented as an 50% reflector, preferably insensitive to angle and achromatic, such as a partially-silvered surface.

In FIG. 15, three beams are shown associated with the lowest point in the field, and are therefore the shallowest beams of the image illumination. The lower beam (solid arrow) passes through collimating optics 376 and a coupling prism 378 and enters the waveguide. After one reflection, it experiences partial reflection by 374 and is split into two beams. The central beam (dashed line) is split at the entrance and the top beam (dash-dot line) is split half way along combiner 372. It is apparent that after the beams are split (thereby splitting the image illumination between the image and its conjugate), the waveguide is illuminated uniformly. Therefore, uniform image is expected after light is coupled out.

If the partial reflector 374 has 50% reflectivity and 50% transmittance then for length equivalent to that of FIG. 5C (14 mm in our example), the waveguide will be illuminated uniformly. In this configuration the aperture of the illuminating optics 376 is very small since the optics is almost adjacent to the entrance of the waveguide, resulting in a small thickness of the optical assembly.

Turning now to FIGS. 16A-16C, this illustrates an alternative scheme for coupling-out of the image in the second region of the LOE toward the eye-motion box for viewing by the eye of the user. The angular representation of FIG. 16A is similar to FIG. 2C, but in this case, the output coupling facets 390 have a steep angle. As a result, image 220B1 is coupled out to 220C (instead of 220B1 as in FIG. 2C). In this configuration, the images 220B can be taller and are not limited by the angle of the facets 390.

FIG. 16B shows schematically how such a configuration looks in real space. As the beam propagates downward (in this drawing), it is partially reflected by the facets downward out of the waveguide. In such a configuration it is preferable to have the facets closely spaced in order to ensure a uniform image.

FIG. 16C shows schematically the preferred reflectivity of facets for such configuration. Here, low reflectivity is desired at the low incidence angles (close to perpendicular) and higher reflectivity (for output coupling) at higher angles. Here too, such properties are readily achieved using appropriately designed multilayer dielectric coatings, as is well-known in the art.

Turning now to FIGS. 17A-17F, various of the preferred embodiments described herein require partial selective application of reflective coatings on only part of a plate which is then assembled into a stack from which part or all of the LOE is then sliced. Partial coating of facets as illustrated in FIG. 17A could potentially introduce scattering effects at the edges of the coating, due to the physical discontinuity in coating as illustrated in schematic cross section in FIG. 17B. Additionally, this mechanical discontinuity may cause mechanical stress on the plates when stacked (as in FIG. 12B). FIGS. 17C-17F illustrate a preferred production method according to an aspect of the present invention for overcoming these limitations.

FIG. 17C illustrates the principles of coating characteristics when a mask 394 is placed close to plate surface 300F but slightly spaced from the surface. When implementing coating (thick arrow), it will coat the plate where there is no mask but close to the mask a gradual decree in coating thickness will be generated around the edge of the mask 396. FIG. 17D illustrates schematically how this characteristic can be used to generate a gradual decrease ("tail-off") of the coating pattern 302F at the periphery of the desired region.

For thin coating thickness, this configuration of gradual thinning of the coating may be sufficient. For thicker coatings, it may be advantageous to use a second mask over the region 302F (FIG. 17E) and to apply a complimentary transparent coating 98 beside the reflecting area 302F, as illustrated in FIG. 17F. It is noted that the mask of FIG. 17E is typically not the exact inverse of the mask of FIG. 17D, since it is preferably increased around the boundary by an amount corresponding to the tailing-off region (which can be determined empirically).

It will be appreciated that the above descriptions are intended only to serve as examples, and that many other embodiments are possible within the scope of the present invention as defined in the appended claims.

What is claimed is:

1. A light guide comprising:
   (a) a clear block of transparent material having an internal volume, said internal volume being an optical continuum without reflecting surfaces internal thereto;
   (b) a first facet block of transparent material containing a first set of mutually-parallel partially-reflecting internal surfaces, said first facet block bonded to said clear block at a first planar interface; and
   (c) a second facet block of transparent material containing a second set of mutually-parallel partially-reflecting internal surfaces, said second facet block bonded to said clear block at a second planar interface, said second planar interface being non-parallel to said first planar interface,
   wherein said clear block, said first facet block and said second facet block together form at least part of a rigid optical assembly bounded by a pair of parallel surfaces for supporting internal reflection within said rigid optical assembly, and wherein said first set of partially-reflecting internal surfaces is parallel to said second set of partially-reflecting internal surfaces, and wherein a straight line between at least one of said first set of partially-reflecting internal surfaces and at least one of said second set of partially-reflecting internal surfaces passes through said clear block.

2. The light guide of claim 1, further comprising a third facet block of transparent material containing a third set of mutually-parallel partially-reflecting internal surfaces, said third facet block bonded to said clear block at a third planar interface, said third facet block forming part of said rigid optical assembly with said third set of partially-reflecting internal surfaces parallel to said first and second sets of partially-reflecting internal surfaces, said third planar interface being non-parallel to both said first and said second planar interfaces.

3. The light guide of claim 2, wherein said first and said second facet blocks abut said third facet block.

4. The light guide of claim 2, wherein said first, said second and said third facet blocks form a continuum around a part of said clear block.

5. The light guide of claim 1, wherein said rigid optical assembly further comprises a coupling-out light guide portion containing a set of coupling-out partial reflectors oriented at an oblique angle to said pair of parallel surfaces.

6. A method for producing the light guide of claim 1, the method comprising the steps of:
   (a) providing:
      (i) a clear block of transparent material having an internal volume, said internal volume being an optical continuum without reflecting surfaces internal thereto, the block having a first planar face and a second planar face non-parallel to the first planar face;
      (ii) a first facet block of transparent material containing a first set of mutually-parallel partially-reflecting internal surfaces, said first facet block having a first planar attachment surface; and
      (iii) a second facet block of transparent material containing a second set of mutually-parallel partially-reflecting internal surfaces, said second facet block having a second planar attachment surface;
   (b) bonding said first attachment surface of said first facet block to said first planar face of said clear block and said second attachment surface of said second facet block to said second planar face of said clear block, thereby forming a rigid optical assembly in which said first set of partially-reflecting internal surfaces are parallel to said second set of partially-reflecting internal surfaces, and in which a straight line between at least one of said first set of partially-reflecting internal surfaces and at least one of said second set of partially-reflecting internal surfaces passes through said clear block; and
   (c) slicing said rigid optical assembly along a plurality of parallel slicing planes passing through said clear block and said first and second facet blocks so as to form a plurality of light guides.

7. The method of claim 6, wherein said step of providing further comprises providing a third facet block of transparent material containing a third set of mutually-parallel partially-reflecting internal surfaces, said third facet block having a third planar attachment surface,
   and wherein said step of bonding further comprises bonding said third attachment surface of said third facet block to a third planar face of said clear block, such that said third facet block forms part of said rigid optical assembly with said third set of partially-reflecting internal surfaces are parallel to said first and second sets of partially-reflecting internal surfaces, said third planar surface of said clear block being non-parallel to both said first and said second planar surfaces.

8. The method of claim 7, wherein, in said rigid optical assembly, said first and said second facet blocks abut said third facet block.

9. The method of claim 7, wherein, in said rigid optical assembly, said first, said second and said third facet blocks form a continuum around a part of said clear block.

10. The method of claim 6, further comprising, prior to said slicing, attaching said rigid optical assembly to an attachment surface of a stack of bonded plates having partially-reflecting interfaces, said interfaces and said attachment surface being deployed such that, after said slicing, each of said plurality of light guides includes a light guide portion having a set of coupling-out partial reflectors oriented at an oblique angle to said slicing planes.

* * * * *